(12) United States Patent  
Meucci

(10) Patent No.: US 8,548,884 B2  
(45) Date of Patent: Oct. 1, 2013

(54) SYSTEMS AND METHODS FOR PORTFOLIO ANALYSIS

(75) Inventor: Attilio Meucci, New York, NY (US)

(73) Assignee: Barclays Capital Inc., New York, NY (US)

( * ) Notice: Subject to any disclaimer, the term of this patent is extended or adjusted under 35 U.S.C. 154(b) by 1300 days.

(21) Appl. No.: 12/166,578

(22) Filed: Jul. 2, 2008

(65) Prior Publication Data

US 2009/0112774 A1 Apr. 30, 2009

Related U.S. Application Data

(60) Provisional application No. 61/000,347, filed on Oct. 24, 2007.

(51) Int. Cl.  
*G06Q 40/00* (2012.01)

(52) U.S. Cl.  
CPC .................................. *G06Q 40/00* (2013.01)  
USPC .................................................... 705/35

(58) Field of Classification Search  
CPC ...................................................... G06Q 40/00  
USPC ............................................................ 705/1–50  
See application file for complete search history.

(56) References Cited

U.S. PATENT DOCUMENTS 7,835,967 B2 * 11/2010 Phelps et al. ................ 705/36 R  
2002/0178098 A1 * 11/2002 Beard ............................ 705/35  
2003/0139993 A1 * 7/2003 Feuerverger .................. 705/36

* cited by examiner

*Primary Examiner* — Bruce I Ebersman  
(74) *Attorney, Agent, or Firm* — Morgan Lewis & Bockius LLP

(57) ABSTRACT

In one aspect, the invention comprises a computer-implemented method comprising: (i) electronically receiving data describing one or more risk factors driving volatility of each of a plurality of securities comprised in a specified portfolio; (ii) for each of the plurality of securities, categorizing each of the risk factors as a random variable and identifying a distribution that best fits each risk factor's historical behavior; and generating a return distribution for the security, based on the best fit distributions; and (iii) aggregating the security return distributions to generate a return distribution for the specified portfolio. Other aspects and embodiments comprise analogous software and computer systems.

12 Claims, 25 Drawing Sheets

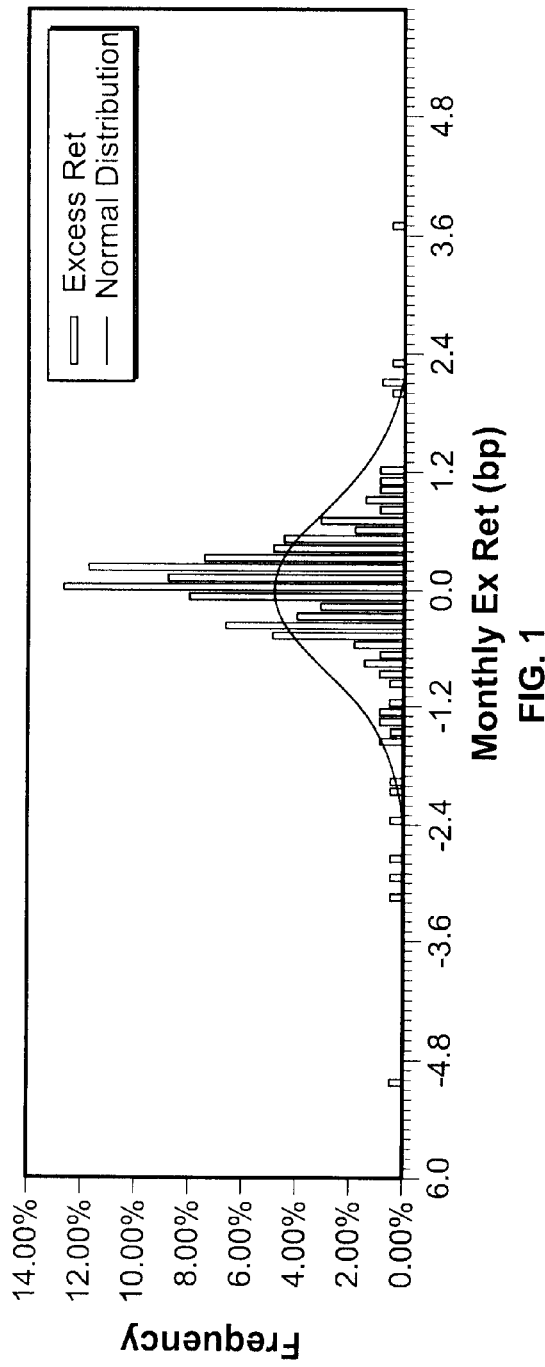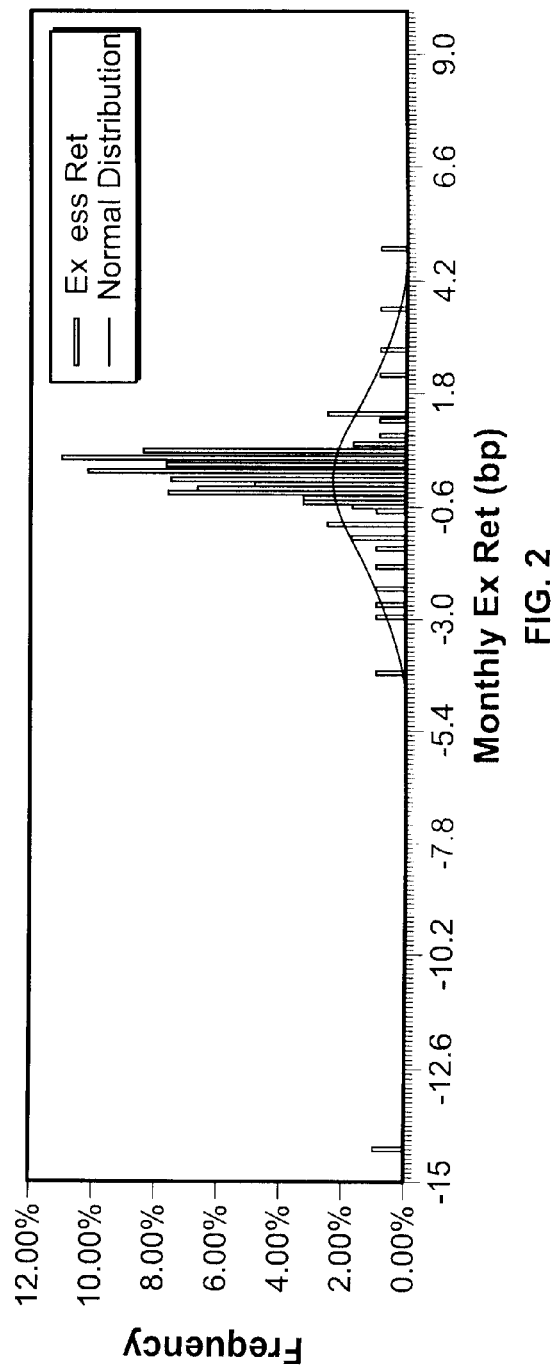

| Net Market Weight % (Portfolio-Benchmark) | | | |
|---|---|---|---|
| Sector | Port | BMK | Net |
| Treasury/Agency/Muni | 53.1 | 33.5 | 19.6 |
| Credit - Inv. Grade | 19.3 | 21.5 | -2.1 |
| Credit - High Yield | 4.2 | 0.0 | 4.2 |
| Securitized | 19.6 | 44.3 | -24.7 |
| Inflation-Linked | 0.0 | 0.0 | 0.0 |
| Emerging Markets | 1.2 | 0.8 | 0.4 |
| Other (Cash, Deriv. etc) | 2.5 | 0.0 | 2.5 |
| Total | 100.0 | 100.0 | -0.0 |

FIG. 8

LEHMAN BROTHERS | POINT  Global Risk Model

VaR Summary

Portfolio: VaR_USAgg - USD
Benchmark: US Aggregate (Statistics)  5/17/2007

| | Portfolio vs. Benchmark | | | Portfolio | | | | Benchmark | | |
|---|---|---|---|---|---|---|---|---|---|---|
| | Volatility | VaR 99% | ES 99% | Volatility | VaR 99% | ES 99% | Volatility | Vola-tility | VaR 99% | ES 99% |
| Total (USD) | 662,901 | 1,515,544 | 1,760,554 | 2,512,799 | 6,047,765 | 7,032,246 | 3,062,080 | 7,530,694 | 8,790,160 |
| Total (bp) | 20.5 | 46.7 | 54.3 | 77.5 | 186.6 | 217.0 | 94.5 | 232.3 | 271.2 |
| Systematic Contributions | 18.5 | 40.7 | 45.5 | 77.0 | 185.3 | 215.4 | 94.5 | 232.3 | 271.1 |
| Currency | 0.0 | 0.0 | 0.0 | 0.0 | 0.0 | 0.0 | 0.0 | 0.0 | 0.0 |
| Yield Curve | 10.7 | 21.1 | 22.8 | 79.5 | 191.4 | 222.5 | 92.5 | 228.4 | 266.2 |
| Inflation-Linked | 0.0 | 0.0 | 0.0 | 0.0 | 0.0 | 0.0 | 0.0 | 0.0 | 0.0 |
| Swap Spreads | 0.6 | 1.3 | 1.5 | 4.5 | 11.0 | 13.0 | 5.1 | 11.9 | 14.2 |
| Volatility | -1.0 | -2.2 | -2.5 | -0.6 | -1.3 | -1.6 | -2.5 | -6.1 | -7.0 |
| Treasury Spreads | 0.1 | 0.2 | 0.2 | -0.4 | -1.1 | -1.3 | -0.3 | -0.9 | -1.1 |
| Credit and Agency Spreads | 3.9 | 9.5 | 11.0 | -5.2 | -12.7 | -14.8 | -3.0 | -7.3 | -8.6 |
| Distressed (CAA-D) | 0.0 | 0.0 | 0.0 | 0.0 | 0.0 | 0.0 | 0.0 | 0.0 | 0.0 |
| Emerging Markets Spread | 0.1 | 0.2 | 0.2 | -0.1 | -0.2 | -0.3 | -0.1 | -0.2 | -0.2 |
| CDS Basis | 0.0 | 0.0 | 0.0 | 0.0 | 0.0 | 0.0 | 0.0 | 0.0 | 0.0 |
| MBS/Securitized | 4.1 | 10.4 | 12.0 | -0.4 | -0.9 | -1.1 | 3.0 | 7.1 | 8.3 |
| CMBS/ABS Spread | 0.1 | 0.2 | 0.2 | -0.4 | -0.8 | -1.0 | -0.3 | -0.7 | -0.8 |
| Municipals | 0.0 | 0.0 | 0.0 | 0.0 | 0.0 | 0.0 | 0.0 | 0.0 | 0.0 |
| Equities | 0.0 | 0.0 | 0.0 | 0.0 | 0.0 | 0.0 | 0.0 | 0.0 | 0.0 |
| Idiosyncratic Contributions | 1.7 | 4.2 | 4.6 | 0.5 | 1.0 | 1.1 | 0.0 | 0.0 | 0.0 |
| Default Contributions | 0.3 | 1.8 | 4.2 | 0.1 | 0.3 | 0.4 | 0.0 | 0.0 | 0.0 |

FIG. 9A

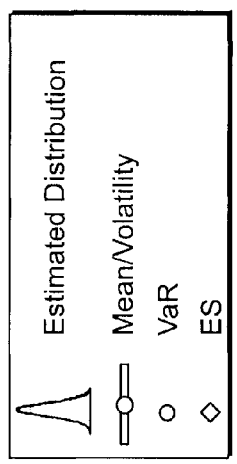
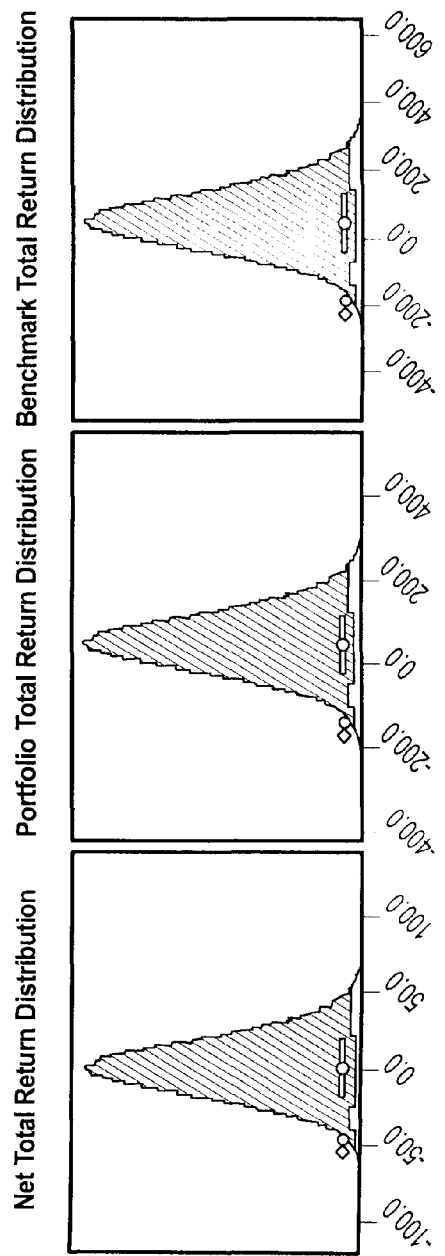
FIG. 9B

LEHMAN BROTHERS | POINT   Global Risk Model

VaR Systematic Details

Portfolio: VaR_USAgg - USD
Benchmark: US Aggregate (Statistics)   5/17/2007

| | Portfolio vs. Benchmark | | | | Portfolio | | | | Benchmark | | | |
|---|---|---|---|---|---|---|---|---|---|---|---|---|
| | Vola-tility | VaR 99% | % | ES 99% | % | Vola-tility | % | VaR 99% | % | ES 99% | % | Vola-tility | % | VaR 99% | % | ES 99% | % |

| | Vola-tility | VaR 99% | % | ES 99% | % | Vola-tility | % | VaR 99% | % | ES 99% | % | Vola-tility | % | VaR 99% | % | ES 99% | % |
|---|---|---|---|---|---|---|---|---|---|---|---|---|---|---|---|---|---|
| Regular Systematic | 18.5 | 100.0 | 40.7 | 100.0 | 45.5 | 100.0 | 77.0 | 100.0 | 185.3 | 100.0 | 215.4 | 100.0 | 94.5 | 100.0 | 232.3 | 100.0 | 271.1 | 100.0 |
| Key Rates and Convexity | | | | | | | | | | | | | | | | | | |
| USD 6M key rate | -0.2 | -0.9 | -0.4 | -0.9 | -0.4 | -0.9 | 1.5 | 2.0 | 3.6 | 1.9 | 4.3 | 2.0 | 1.3 | 1.4 | 3.2 | 1.4 | 3.8 | 1.4 |
| USD 2Y key rate | 1.3 | 7.2 | 3.0 | 7.4 | 3.2 | 7.1 | 10.4 | 13.5 | 24.7 | 13.3 | 28.5 | 13.2 | 12.1 | 12.8 | 28.8 | 12.4 | 32.8 | 12.1 |
| USD 5Y key rate | 3.6 | 19.2 | 8.1 | 19.8 | 8.8 | 19.4 | 24.0 | 31.2 | 57.7 | 31.2 | 66.5 | 30.8 | 28.3 | 30.0 | 68.4 | 29.5 | 78.3 | 28.9 |
| USD 10Y key rate | 5.5 | 30.0 | 12.9 | 31.8 | 14.4 | 31.6 | 23.2 | 30.1 | 57.4 | 31.0 | 67.4 | 31.3 | 29.8 | 31.6 | 74.0 | 31.8 | 87.2 | 32.2 |
| USD 20Y key rate | 1.2 | 6.4 | 2.8 | 6.8 | 3.1 | 6.7 | 12.6 | 16.4 | 31.3 | 16.9 | 36.7 | 17.0 | 14.1 | 14.9 | 34.9 | 15.0 | 41.3 | 15.2 |
| USD 30Y key rate | -0.8 | -4.4 | -1.9 | -4.7 | -2.1 | -4.6 | 7.8 | 10.1 | 19.2 | 10.3 | 22.4 | 10.4 | 6.9 | 7.3 | 16.9 | 7.3 | 19.9 | 7.4 |
| USD Convexity | 0.1 | 0.4 | -3.3 | -8.2 | -4.2 | -9.2 | 0.0 | 0.0 | -2.4 | -1.3 | -3.4 | -1.6 | 0.0 | 0.0 | 2.1 | 0.9 | 2.9 | 1.1 |
| Credit Non-Distressed (AAA-B) Spread & Vol. | | | | | | | | | | | | | | | | | | |
| USD Ultra High Grade Industrials | 0.9 | 4.9 | 2.3 | 5.6 | 2.7 | 6.0 | -1.8 | -2.4 | -4.5 | -2.4 | -5.4 | -2.5 | -1.3 | -1.3 | -3.1 | -1.3 | -3.6 | -1.3 |
| USD Ultra High Grade Utilities | -0.0 | -0.2 | -0.1 | -0.2 | -0.1 | -0.2 | -0.1 | -0.2 | -0.4 | -0.2 | -0.4 | -0.2 | -0.2 | -0.2 | -0.5 | -0.2 | -0.6 | -0.2 |
| USD Ultra High Grade Financials | 0.3 | 1.7 | 0.8 | 1.9 | 0.9 | 2.0 | -0.8 | -1.1 | -2.0 | -1.1 | -2.4 | -1.1 | -0.7 | -0.7 | -1.6 | -0.7 | -2.0 | -0.7 |
| USD Ultra High Grade Non Corporate | -0.2 | -0.8 | -0.4 | -0.9 | -0.4 | -0.9 | -0.0 | -0.1 | -0.1 | -0.1 | -0.1 | -0.1 | -0.2 | -0.2 | -0.4 | -0.2 | -0.5 | -0.2 |
| USD High Yield Industrials | 1.6 | 8.6 | 3.8 | 9.3 | 4.1 | 9.0 | -1.1 | -1.4 | -2.6 | -1.4 | -2.9 | -1.3 | -0.0 | -0.0 | -0.0 | -0.0 | -0.0 | -0.0 |
| USD IND Short Maturity | 0.0 | 0.1 | 0.1 | 0.2 | 0.1 | 0.2 | 0.0 | 0.0 | 0.0 | 0.0 | 0.0 | 0.0 | 0.0 | 0.0 | 0.1 | 0.0 | 0.1 | 0.0 |
| USD UTI Short Maturity | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| USD FIN Short Maturity | 0.0 | 0.1 | 0.0 | 0.1 | 0.0 | 0.1 | 0.0 | 0.0 | 0.1 | 0.0 | 0.1 | 0.0 | 0.0 | 0.0 | 0.1 | 0.0 | 0.1 | 0.0 |
| USD NONCRP Short Maturity | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |

FIG. 10A

| MBS Spread & Vol. | | | | | | | | | | | | | | | | |
|---|---|---|---|---|---|---|---|---|---|---|---|---|---|---|---|---|
| US 30-Year Mortgage Spread | -0.0 | -0.2 | -0.1 | -0.2 | -0.1 | -0.2 | -0.0 | -0.0 | -0.0 | -0.0 | -0.1 | -0.1 | -0.1 | -0.1 | -0.1 | -0.0 |
| US 15-Year Mortgage Spread | 0.0 | 0.0 | 0.0 | 0.0 | 0.0 | 0.0 | -0.0 | -0.0 | -0.0 | -0.0 | 0.0 | 0.0 | 0.0 | 0.0 | 0.0 | 0.0 |
| US Hybrid Mortgage Spread | 0.0 | 0.1 | 0.0 | 0.1 | 0.0 | 0.1 | -0.0 | -0.0 | -0.0 | -0.0 | 0.0 | 0.0 | 0.1 | 0.1 | 0.1 | 0.0 |
| USD MBS New Discount | 0.7 | 4.0 | 1.8 | 4.5 | 2.1 | 4.7 | 0.1 | 0.2 | 0.3 | 0.0 | 0.7 | 0.8 | 1.7 | 1.5 | 2.0 | 0.7 |
| USD MBS New Current | 0.8 | 4.6 | 2.1 | 5.3 | 2.5 | 5.5 | 0.0 | 0.0 | 0.0 | 0.2 | 0.6 | 0.7 | 1.5 | 1.3 | 1.7 | 0.6 |
| USD MBS New Premium | -0.1 | -0.4 | -0.2 | -0.4 | -0.2 | -0.4 | -0.0 | -0.0 | -0.0 | 0.0 | -0.1 | -0.1 | -0.2 | -0.1 | -0.3 | -0.1 |
| USD MBS Seasoned Discount | 1.4 | 7.7 | 3.6 | 8.9 | 4.2 | 9.2 | 0.1 | 0.1 | 0.2 | 0.1 | 1.3 | 1.4 | 3.1 | 1.3 | 3.5 | 1.3 |
| USD MBS Seasoned Current | 0.9 | 4.7 | 2.3 | 5.6 | 2.7 | 5.9 | 0.3 | 0.3 | 0.7 | 0.3 | 1.0 | 1.0 | 2.4 | 1.0 | 2.8 | 1.0 |
| USD MBS Seasoned Premium | 0.2 | 1.2 | 0.5 | 1.2 | 0.5 | 1.1 | -0.4 | -0.6 | -1.2 | -0.6 | -0.2 | -0.2 | -0.6 | -0.2 | -0.6 | -0.2 |
| USD MBS GNMA 30Y | -0.0 | -0.1 | -0.1 | -0.2 | -0.1 | -0.1 | -0.0 | -0.0 | -0.0 | -0.0 | -0.0 | -0.0 | -0.0 | -0.0 | -0.1 | -0.0 |
| USD MBS Conv 15Y | -0.2 | -0.9 | -0.4 | -0.9 | -0.4 | -0.9 | -0.0 | -0.0 | -0.1 | -0.0 | -0.2 | -0.2 | -0.6 | -0.2 | -0.6 | -0.2 |
| USD MBS GNMA 15Y | -0.0 | -0.0 | -0.0 | -0.0 | -0.0 | -0.0 | -0.0 | -0.0 | -0.0 | -0.0 | -0.0 | -0.0 | -0.0 | -0.0 | -0.0 | -0.0 |
| USD MBS Conv Balloon | 0.3 | 1.5 | 0.7 | 1.7 | 0.8 | 1.7 | -0.3 | -0.4 | -1.0 | -0.4 | -0.1 | -0.1 | -0.1 | -0.1 | -0.2 | -0.1 |
| US Agency Hybrid Discount | -0.0 | -0.1 | -0.0 | -0.1 | -0.0 | -0.1 | -0.0 | -0.0 | -0.0 | -0.0 | -0.0 | -0.0 | -0.0 | -0.0 | -0.0 | -0.0 |
| US Agency Hybrid Current | -0.0 | -0.1 | -0.0 | -0.1 | -0.0 | -0.1 | -0.0 | -0.0 | -0.0 | -0.0 | -0.0 | -0.0 | -0.0 | -0.0 | -0.0 | -0.0 |
| US Agency Hybrid Premium | 0.0 | 0.2 | 0.1 | 0.2 | 0.1 | 0.2 | 0.0 | 0.0 | 0.0 | 0.0 | 0.0 | 0.0 | 0.1 | 0.0 | 0.1 | 0.0 |
| USD MBS Short/Derivative Volatility | -0.1 | -0.3 | -0.1 | -0.3 | -0.1 | -0.3 | -0.1 | -0.1 | -0.2 | -0.1 | -0.2 | -0.2 | -0.4 | -0.2 | -0.5 | -0.2 |
| USD MBS Long/Derivative Volatility | -1.0 | -5.6 | -2.2 | -5.5 | -2.5 | -5.5 | -0.3 | -0.3 | -0.7 | -0.3 | -2.1 | -2.3 | -5.2 | -2.2 | -6.0 | -2.2 |

FIG. 10B

| LEHMAN BROTHERS \| POINT | | | | | | | | | | | | | | | Global Risk Model | |
|---|---|---|---|---|---|---|---|---|---|---|---|---|---|---|---|---|
| VaR Default Details | | | | | | | | | | | | | | | 5/17/2007 | |
| Portfolio: VaR_USAgg - USD | | | | | | | | | | | | | | | | |
| Benchmark: US Aggregate (Statistics) | | | | | | | | | | | | | | | | |
| | Portfolio vs. Benchmark | | | | Portfolio | | | | | Benchmark | | | | | | |
| | Vola-tility | % | VaR 99% | % | ES 99% | % | Vola-tility | % | VaR 99% | % | ES 99% | % | Vola-tility | % | VaR 99% | % | ES 99% | % |
| Total Credit | 0.3 | 100.0 | 1.8 | 100.0 | 4.2 | 100.0 | 0.1 | 100.0 | 0.3 | 100.0 | 0.4 | 100.0 | 0.0 | 100.0 | 0.0 | 100.0 | 0.0 | 100.0 |
| CAL | 0.1 | 36.0 | 0.6 | 33.7 | 2.4 | 57.7 | 0.0 | 35.5 | 0.1 | 39.5 | 0.1 | 33.0 | -0.0 | 0.2 | -0.0 | 0.0 | 0.0 | 0.0 |
| BOW | 0.1 | 25.4 | 0.7 | 37.3 | 1.0 | 24.8 | 0.0 | 24.7 | 0.1 | 30.8 | 0.1 | 36.1 | -0.0 | -0.0 | -0.0 | -0.0 | -0.0 | -0.0 |
| GET | 0.1 | 22.9 | 0.2 | 19.0 | 0.4 | 8.6 | 0.0 | 22.2 | 0.0 | 15.0 | 0.1 | 16.2 | -0.0 | -0.0 | 0.0 | 0.0 | -0.0 | -0.0 |
| ETP | 0.0 | 5.0 | 0.2 | 9.0 | 0.2 | 4.7 | 0.0 | 5.1 | 0.0 | 1.9 | 0.0 | 10.3 | 0.0 | 0.1 | -0.0 | 3.0 | 0.0 | 2.8 |
| MNI | 0.0 | 3.4 | 0.1 | 2.9 | 0.1 | 1.4 | 0.0 | 3.2 | 0.0 | 6.3 | 0.0 | 0.0 | 0.0 | 0.0 | 0.0 | -0.0 | -0.0 | -0.0 |
| CVRD | 0.0 | 1.9 | 0.0 | 1.0 | 0.1 | 1.4 | 0.0 | 2.7 | 0.0 | 0.0 | 0.0 | 0.0 | 0.0 | 3.2 | 0.0 | 0.0 | 0.0 | 0.0 |
| CMCSA | 0.0 | 1.3 | 0.0 | 0.6 | 0.0 | 1.0 | 0.0 | 2.3 | 0.0 | 0.0 | 0.0 | 0.0 | 0.0 | 5.7 | 0.0 | 0.0 | -0.0 | -0.0 |
| EOP | 0.0 | 1.0 | 0.0 | 2.1 | 0.0 | 0.5 | 0.0 | 1.0 | 0.0 | 0.0 | -0.0 | 0.0 | -0.0 | -0.0 | 0.0 | 0.0 | 0.0 | 0.0 |
| REPHUN | 0.0 | 0.6 | 0.0 | 0.0 | 0.0 | 0.0 | 0.0 | 0.6 | 0.0 | 0.0 | 0.0 | 0.0 | 0.0 | 0.0 | 0.0 | 0.0 | 0.0 | 0.0 |
| COXENT | 0.0 | 0.6 | 0.0 | 1.0 | 0.0 | 0.4 | 0.0 | 0.8 | 0.0 | 0.0 | 0.0 | 0.0 | 0.0 | 0.9 | 0.0 | 0.0 | 0.0 | 0.0 |
| EP | 0.0 | 0.2 | -0.0 | -0.2 | -0.0 | -0.1 | 0.0 | 0.0 | 0.0 | 0.0 | -0.0 | -0.0 | 0.0 | 6.2 | 0.0 | 10.9 | 0.0 | 0.0 |
| CAMHIH | 0.0 | 0.2 | 0.0 | 0.3 | 0.0 | 0.3 | 0.0 | 0.2 | -0.0 | -0.0 | -0.0 | 0.0 | 0.0 | 0.0 | 0.0 | 0.0 | 0.0 | 0.0 |
| S | 0.0 | 0.1 | -0.0 | -0.0 | -0.0 | -0.0 | 0.0 | 0.0 | -0.0 | -0.0 | -0.0 | -0.0 | 0.0 | 4.8 | 0.0 | 0.0 | 0.0 | 0.0 |
| TWX | 0.0 | 0.1 | -0.0 | -0.0 | -0.0 | -0.0 | 0.0 | 0.0 | -0.0 | -0.0 | -0.0 | -0.0 | 0.0 | 4.0 | 0.0 | 0.0 | 0.0 | 0.0 |
| SE | 0.0 | 0.1 | 0.0 | 0.2 | 0.0 | 0.2 | 0.0 | 0.2 | 0.0 | 0.4 | 0.0 | 0.0 | 0.0 | 0.3 | 0.0 | 0.1 | 0.0 | 0.0 |

FIG. 11

Credit Tickers

Portfolio: VaR_USAgg
Benchmark: US Aggregate (Statistics)

5/17/2007

| Ticker | Name | Sector | Rating | Currency | # Issues in Portfolio | Portfolio Weight (%) | Benchmark Weight (%) | Net Weight (%) | Net Contribution to OASD (Yr) | Systematic TEV (bps) | Idiosyncratic TEV (bps) |
|---|---|---|---|---|---|---|---|---|---|---|---|
| CAL | Continental Airls Pass Thru | Airlines | BAA2 BAA1 BA2 | USD | 2 | 2.7 | 0.03 | 2.67 | 0.133 | 3.06 | 3.48 |
| C | Associates Corp No Amer | Banking | AA2 AA1 | USD | 2 | 1.32 | 0.43 | 0.89 | 0.159 | 3.24 | 2.38 |
| BMY | Bristol-Myers Squibb | Pharmaceuticals | A1 | USD | 1 | 1.0 | 0.04 | 0.96 | 0.154 | 3.15 | 2.02 |
| MNI | Knight-Ridder Inc | Media_Noncable | BA2 | USD | 1 | 0.64 | 0.0 | 0.64 | 0.069 | 1.73 | 1.88 |
| T | Bellsouth Tele | Wirelines | A2 | USD | 1 | 0.33 | 0.47 | -0.15 | 0.043 | 1.12 | 1.4 |
| CMCSA | Comcast Cable Communication | Media-Cable | BAA1 | USD | 2 | 0.97 | 0.26 | 0.7 | 0.073 | 1.56 | 1.2 |
| BOW | Bowater | Paper | B1 | USD | 1 | 0.58 | 0.0 | 0.58 | 0.028 | 1.01 | 0.84 |
| UBS | Swiss Bank Corp - New York | Banking | AA2 AAA | USD | 1 | 0.87 | 0.06 | 0.81 | 0.092 | 1.94 | 0.79 |
| ROK | Rockwell Intl | Industrial_Other | A2 | USD | 1 | 0.76 | 0.0 | 0.76 | 0.088 | 1.8 | 0.7 |
| ETP | Energy Transfer Partners LP | Pipelines | BAA3 | USD | 1 | 0.76 | 0.02 | 0.74 | 0.055 | 1.16 | 0.61 |
| REPHUN | Hungary Republic of - Global | Sovereigns | BAA1 | USD | 1 | 0.45 | 0.02 | 0.43 | 0.027 | 0.69 | 0.42 |
| PNC | PNC Funding Corp | Banking | A3 A2 | USD | 1 | 0.77 | 0.04 | 0.72 | 0.055 | 1.22 | 0.4 |
| AVP | Avon Products Inc | Consumer_Products | A2 | USD | 1 | 0.62 | 0.01 | 0.61 | 0.053 | 1.14 | 0.39 |
| USM | US Cellular Corp | Wireless | BAA3 | USD | 1 | 0.16 | 0.01 | 0.16 | 0.019 | 0.41 | 0.37 |
| DIS | Walt Disney | Entertainment | A3 | USD | 1 | 0.75 | 0.05 | 0.7 | 0.056 | 1.19 | 0.35 |
| CVRD | Inco Ltd | Metals_and_Mining | BAA3 | USD | 1 | 0.4 | 0.08 | 0.33 | 0.021 | 0.56 | 0.32 |
| WFC | Wells Fargo + Co - Global | Banking | AA1 AA2 AA3 | USD | 2 | 1.3 | 0.23 | 1.07 | 0.044 | 1.06 | 0.25 |
| WM | Washington Mutual Cap I | Banking | A3 A2 | USD | 2 | 0.33 | 0.1 | 0.23 | 0.02 | 0.41 | 0.22 |
| GET | Gaylord Entertainment Co | Lodging | B3 | USD | 1 | 0.31 | 0.0 | 0.31 | 0.015 | 0.32 | 0.22 |
| LEH | Lehman Brothers Holdings Inc | Brokerage | A1 A2 | USD | 1 | 0.39 | 0.19 | 0.2 | 0.02 | 0.46 | 0.22 |

FIG. 12

LEHMAN BROTHERS | POINT

VaR Summary

Portfolio: US HY (Statistics) - USD
Benchmark: cash_USD
Reporting Units: Returns in bps/month Global Risk Model
6/29/2007

| | Portfolio vs. Benchmark | | | | Portfolio | | | | Benchmark | | | |
|---|---|---|---|---|---|---|---|---|---|---|---|---|
| | Volatility | VaR 99% | ES 99% | Volatility | VaR 99% | ES 99% | Volatility | VaR 99% | ES 99% |
| Total (USD) | 6,391,226.8 | 16,840,871.7 | 20,256,389.0 | 6,391,226.8 | 16,840,871.7 | 20,256,389.0 | 0.0 | 0.0 | 0.0 |
| Total (bp) | 97 | 257 | 309 | 97 | 257 | 309 | 0 | 0 | 0 |
| Systematic Contributions | 57.2 | 201.2 | 206.7 | 87.2 | 201.2 | 206.7 | 0.0 | 0.0 | 0.0 |
| Currency | 0.0 | 0.0 | 0.0 | 0.0 | 0.0 | 0.0 | 0.0 | 0.0 | 0.0 |
| Yield Curve | 38.1 | 79.2 | 72.0 | 38.1 | 79.2 | 72.0 | 0.0 | 0.0 | 0.0 |
| Inflation-Linked | 0.0 | 0.0 | 0.0 | 0.0 | 0.0 | 0.0 | 0.0 | 0.0 | 0.0 |
| Swap Spreads | 6.6 | 16.7 | 17.1 | 6.6 | 16.7 | 17.1 | 0.0 | 0.0 | 0.0 |
| Volatility | -1.2 | -2.5 | -2.1 | -1.2 | -2.5 | -2.1 | 0.0 | 0.0 | 0.0 |
| Treasury Spreads | 0.0 | 0.0 | 0.0 | 0.0 | 0.0 | 0.0 | 0.0 | 0.0 | 0.0 |
| Credit and Agency Spreads | 32.3 | 77.7 | 82.8 | 32.3 | 77.7 | 82.8 | 0.0 | 0.0 | 0.0 |
| Distressed (CAA-D) | 11.3 | 30.2 | 36.9 | 11.3 | 30.2 | 36.9 | 0.0 | 0.0 | 0.0 |
| Emerging Markets Spread | 0.0 | 0.0 | 0.0 | 0.0 | 0.0 | 0.0 | 0.0 | 0.0 | 0.0 |
| CDS Basis | 0.0 | 0.0 | 0.0 | 0.0 | 0.0 | 0.0 | 0.0 | 0.0 | 0.0 |
| MBS/Securitized | 0.0 | 0.0 | 0.0 | 0.0 | 0.0 | 0.0 | 0.0 | 0.0 | 0.0 |
| CMBS/ABS Spread | 0.0 | 0.0 | 0.0 | 0.0 | 0.0 | 0.0 | 0.0 | 0.0 | 0.0 |
| Municipals | 0.0 | 0.0 | 0.0 | 0.0 | 0.0 | 0.0 | 0.0 | 0.0 | 0.0 |
| Equities | 0.0 | 0.0 | 0.0 | 0.0 | 0.0 | 0.0 | 0.0 | 0.0 | 0.0 |
| Correlation | 0.0 | 0.0 | 0.0 | 0.0 | 0.0 | 0.0 | 0.0 | 0.0 | 0.0 |
| Idiosyncratic Contributions | 2.9 | 6.3 | 6.3 | 2.9 | 6.3 | 6.3 | 0.0 | 0.0 | 0.0 |
| Default Contributions | 7.4 | 49.2 | 95.7 | 7.4 | 49.2 | 95.7 | 0.0 | 0.0 | 0.0 |

FIG. 13A

|  | | | | | | |
|---|---|---|---|---|---|---|
| Systematic Isolated | 92.2 | 220.5 | 259.0 | 92.2 | 220.5 | 259.0 | 0.0 | 0.0 |
| Idiosyncratic Isolated | 16.7 | 43.6 | 54.9 | 16.7 | 43.6 | 54.9 | 0.0 | 0.0 |
| Default Isolated | 26.8 | 123.5 | 195.5 | 26.8 | 123.5 | 195.5 | 0.0 | 0.0 |
| Carry | 21.7 | | | 67.5 | | | 45.8 | |
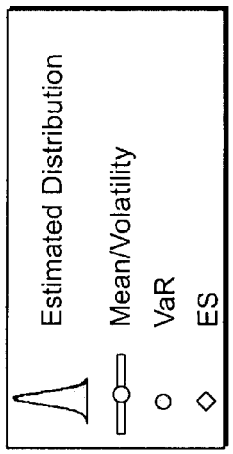
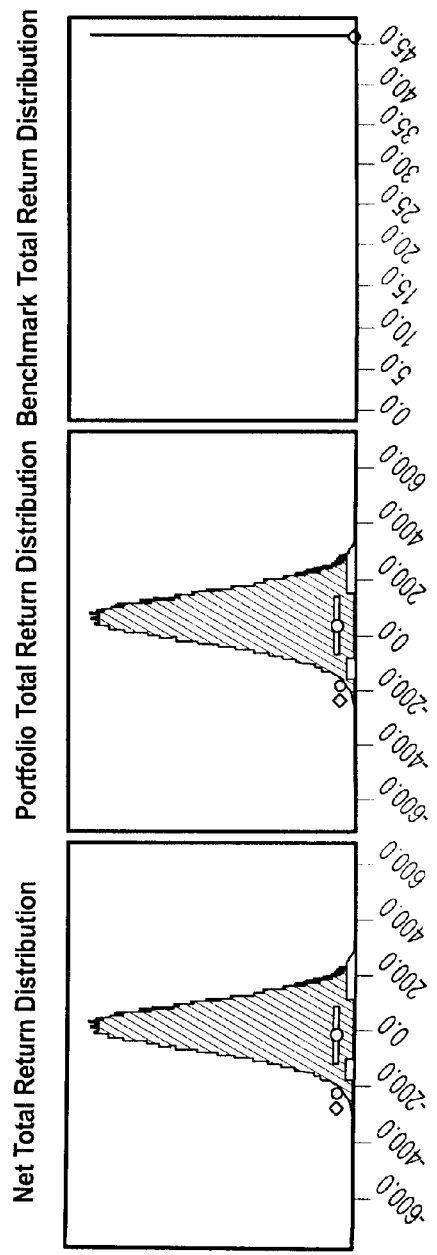
Net Total Return Distribution   Portfolio Total Return Distribution   Benchmark Total Return Distribution
FIG. 13B

VaR Default Details
Portfolio:         US HY (Statistics) - USD
Benchmark:         cash_USD
Reporting Units:   Returns in bps/month

|  | Portfolio vs. Benchmark | | | | | |
|---|---|---|---|---|---|---|
|  | Volatility | % | VaR 99% | % | ES 99% | % |
| Total Credit | 7.4 | 100.0 | 49.2 | 100.0 | 95.7 | 100.0 |
| F | 2.2 | 29.6 | 13.9 | 28.3 | 50.6 | 52.9 |
| CHTR | 1.0 | 13.5 | 6.4 | 13.1 | 6.8 | 7.1 |
| GMAC | 0.1 | 1.9 | 1.4 | 2.8 | 2.6 | 2.7 |
| OI | 0.1 | 1.8 | 0.9 | 1.8 | 1.1 | 1.1 |
| RAD | 0.1 | 1.7 | 0.7 | 1.4 | 1.0 | 1.0 |
| THC | 0.1 | 1.6 | 0.8 | 1.5 | 0.8 | 0.9 |
| DYN | 0.1 | 1.2 | 0.7 | 1.4 | 0.3 | 0.4 |
| GP | 0.1 | 0.9 | 0.3 | 0.6 | 0.4 | 0.4 |
| LVLT | 0.1 | 0.9 | 0.4 | 0.9 | 0.3 | 0.3 |
| RHD | 0.1 | 0.8 | 0.3 | 0.7 | 0.4 | 0.4 |
| FCX | 0.0 | 0.6 | 0.4 | 0.8 | 0.4 | 0.4 |
| HCA | 0.0 | 0.6 | 0.0 | 0.1 | 0.2 | 0.2 |
| LYO | 0.0 | 0.6 | 0.3 | 0.6 | 0.3 | 0.4 |
| AW | 0.0 | 0.6 | 0.2 | 0.4 | 0.3 | 0.4 |
| SVU | 0.0 | 0.5 | 0.2 | 0.5 | 0.4 | 0.4 |

FIG. 14

| LEHMAN BROTHERS \| POINT | | | | | | | Market Structure |
|---|---|---|---|---|---|---|---|
| Port: VaR_Convexity | | | | | | Run Date: 3/13/2007 | |
| Index: US Agencies | | | | | | As of: 03/12/2007 | |
| Diff: Difference: Port - Index | | | | | | Base Currency: USD | |

| | OAD | 6mo KRD | 2yr KRD | 5yr KRD | 10yr KRD | 20yr KRD | 30yr KRD | OAC |
|---|---|---|---|---|---|---|---|---|
| Port | 3.41 | .17 | .09 | 1.03 | 1.04 | .10 | .00 | -5.01 |
| Index | 3.61 | .15 | .78 | 1.09 | 1.00 | .36 | .24 | .08 |
| Diff | -.19 | .02 | -.69 | -.05 | .04 | -.25 | -.24 | -1.09 |

FIG. 15

LEHMAN BROTHERS | POINT                                                                                                            Global Risk Model VaR Summary                                                                                                                                    3/12/2007

Portfolio:   VaR_Convexity - 29,984,744 USD
Benchmark:   US Agencies

| | Portfolio vs. Benchmark | | | Portfolio | | | Benchmark | | |
|---|---|---|---|---|---|---|---|---|---|
| | Volatility | VaR 99% | ES 99% | Volatility | VaR 99% | ES 99% | Volatility | VaR 99% | ES 99% |
| Total (USD) | 53,690 | 220,522 | 287,687 | 208,489 | 642,586 | 782,808 | 221,181 | 535,641 | 622,141 |
| Total (bp) | 17.9 | 73.5 | 95.9 | 69.5 | 214.3 | 261.1 | 73.8 | 178.6 | 207.5 |
| Systematic Contributions | 16.7 | 72.3 | 95.0 | 69.3 | 213.9 | 260.6 | 73.7 | 178.6 | 207.4 |
| Currency | 0.0 | 0.0 | 0.0 | 0.0 | 0.0 | 0.0 | 0.0 | 0.0 | 0.0 |
| Yield Curve | 12.5 | 59.8 | 90.8 | 72.3 | 224.9 | 273.2 | 71.9 | 174.5 | 202.4 |
| Inflation-Linked | 0.0 | 0.0 | 0.0 | 0.0 | 0.0 | 0.0 | 0.0 | 0.0 | 0.0 |
| Swap Spreads | 0.4 | 0.6 | 0.6 | 5.4 | 11.7 | 14.2 | 5.6 | 13.5 | 16.1 |
| Volatility | 3.8 | 12.6 | 14.6 | -6.7 | -17.9 | -20.8 | -0.9 | -2.3 | -2.7 |
| Treasury Spreads | 0.0 | 0.0 | 0.0 | 0.0 | 0.0 | 0.0 | 0.0 | 0.0 | 0.0 |
| Credit and Agency Spreads | 0.1 | -0.6 | -0.7 | -1.7 | -4.9 | -6.1 | -2.7 | -6.8 | -8.0 |
| Distressed Spreads (CAA-C) | 0.0 | 0.0 | 0.0 | 0.0 | 0.0 | 0.0 | 0.0 | 0.0 | 0.0 |
| Emerging Markets Spread | -0.0 | -0.3 | -0.2 | 0.0 | 0.0 | 0.0 | -0.1 | -0.4 | -0.4 |
| CDS Basis | 0.0 | 0.0 | 0.0 | 0.0 | 0.0 | 0.0 | 0.0 | 0.0 | 0.0 |
| MBS/Securitized | 0.0 | 0.0 | 0.0 | 0.0 | 0.0 | 0.0 | 0.0 | 0.0 | 0.0 |
| CMBS/ABS Spread | 0.0 | 0.0 | 0.0 | 0.0 | 0.0 | 0.0 | 0.0 | 0.0 | 0.0 |
| Municipals | 0.0 | 0.0 | 0.0 | 0.0 | 0.0 | 0.0 | 0.0 | 0.0 | 0.0 |
| Equities | 0.0 | 0.0 | 0.0 | 0.0 | 0.0 | 0.0 | 0.0 | 0.0 | 0.0 |
| Idiosyncratic Contributions | 1.2 | 1.3 | 0.9 | 0.3 | 0.4 | 0.5 | 0.0 | 0.0 | 0.0 |
| Default Contributions | 0.0 | 0.0 | 0.0 | 0.0 | 0.0 | 0.0 | 0.0 | 0.0 | 0.0 |

FIG. 16A

| | | | | | | | Ⓑ | |
|---|---|---|---|---|---|---|---|---|
| Systematic Isolated | 17.3 | 72.8 | 95.6 | 69.1 | 214.1 | 260.9 | 73.8 | 178.6 | 207.5 |
| Idiosyncratic Isolated | 4.6 | 12.1 | 15.1 | 4.4 | 11.6 | 14.4 | 1.5 | 3.5 | 4.4 |
| Default Isolated | 0.7 | 0.0 | 0.0 | 0.0 | 0.0 | 0.0 | 0.7 | 0.0 | 0.5 |
| Carry | | 3.7 | | | 45.5 | | | 41.9 | |
Ⓐ
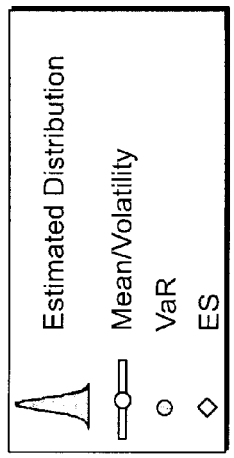
Estimated Distribution
— Mean/Volatility
○ VaR
◇ ES
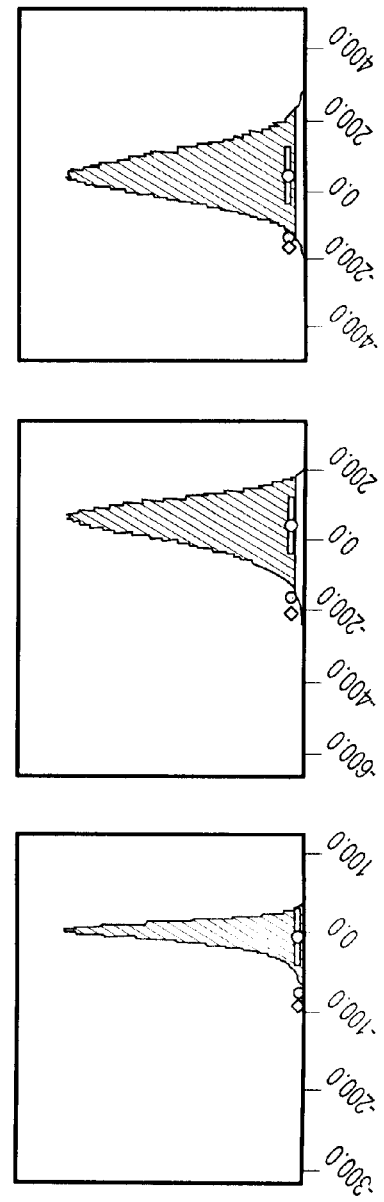
Net Total Return Distribution     Portfolio Total Return Distribution     Benchmark Total Return Distribution
FIG. 16B

VaR Systematic Details

Portfolio: VaR_Convexity - 29,984.744 USD
Benchmark: US Agencies

3/12/2007

| | Portfolio vs. Benchmark | | | | | | Portfolio | | | | | | Benchmark | | | | |
|---|---|---|---|---|---|---|---|---|---|---|---|---|---|---|---|---|---|
| | Vola-tility | % | VaR 99% | % | Es 99% | % | Vola-tility | % | VaR 99% | % | Es 99% | % | Vola-tility | % | VaR 99% | % | Es 99% | % |
| Regular Systematic | 16.7 | 100.0 | 72.3 | 100.0 | 95.0 | 100.0 | 69.3 | 100.0 | 213.9 | 100.0 | 260.6 | 100.0 | 73.7 | 100.0 | 178.6 | 100.0 | 207.4 | 100.0 |
| Key Rates and Convexity | | | | | | | | | | | | | | | | | | |
| USD 6M key rate | -0.1 | -0.8 | -0.4 | -0.5 | -0.4 | -0.5 | 1.3 | 2.0 | 3.7 | 1.7 | 4.5 | 1.7 | 1.4 | 1.9 | 3.4 | 1.9 | 4.2 | 2.0 |
| USD 2Y key rate | 6.7 | 40.2 | 21.4 | 29.6 | 23.6 | 24.9 | 1.6 | 2.4 | 4.1 | 1.9 | 4.7 | 1.8 | 14.6 | 19.8 | 35.1 | 19.6 | 40.3 | 19.4 |
| USD 5Y key rate | 0.5 | 2.7 | 1.8 | 2.5 | 2.0 | 2.1 | 22.4 | 32.4 | 55.6 | 26.0 | 63.7 | 24.4 | 24.5 | 33.2 | 59.3 | 33.2 | 68.0 | 32.8 |
| USD 10Y key rate | -6.2 | -37.0 | -30.9 | -42.8 | -35.3 | -37.2 | 42.6 | 62.5 | 108.7 | 50.8 | 127.8 | 49.0 | 21.1 | 28.6 | 52.1 | 29.2 | 61.2 | 29.5 |
| USD 20Y key rate | 1.1 | 6.4 | 6.2 | 8.5 | 7.2 | 7.5 | 1.9 | 2.7 | 4.9 | 2.3 | 5.7 | 2.2 | 6.4 | 8.7 | 15.8 | 8.8 | 18.6 | 9.0 |
| USD 30Y key rate | 0.9 | 5.1 | 5.3 | 7.3 | 6.1 | 6.5 | 0.0 | 0.0 | 0.0 | 0.0 | 0.0 | 0.0 | 3.9 | 5.4 | 9.6 | 5.4 | 11.2 | 5.4 |
| USD Convexity | 9.7 | 58.3 | 56.6 | 78.3 | 77.6 | 81.7 | 2.4 | 3.5 | 48.0 | 22.4 | 66.9 | 25.7 | 0.0 | 0.0 | -0.7 | -0.4 | -1.0 | -0.5 |

FIG. 17

SYSTEMS AND METHODS FOR PORTFOLIO ANALYSIS

CROSS REFERENCE TO RELATED APPLICATIONS

This application claims priority to U.S. Provisional Patent Application No. 61/000,347, filed Oct. 24, 2007. The entire contents of that provisional application are incorporated herein by reference.

INTRODUCTION

Embodiments of the present invention relate to portfolio tail risk measurement. At least one or more of those embodiments comprise methods, systems, and software based on a Tail Risk Model. Such embodiments deliver to portfolio managers and traders the complete probability distribution of their portfolio's return (or P&L) and tracking errors which are then summarized by three risk measures: volatility, value at risk, and expected shortfall.

The Tail Risk Model embodiments preferably provide detailed tail risk reports that permit the portfolio manager to examine particular sources of portfolio tail risk. In an embodiment, the Tail Risk Model is implemented within, and is fully consistent with, the Lehman Global Risk Model.

Portfolio managers have long known that the forces driving their world are not always smooth or symmetrical. While the familiar symmetrical, bell-shaped normal distribution may describe some natural phenomena, portfolio managers know that this distribution does a poor job of describing market returns.

Portfolio managers know that clients tend to react more strongly to losses than they do to similar-sized gains. In addition, large losses are particularly damaging to a manager's reputation and business. Consequently, managers care very much about the extreme (or "tail") behavior of their portfolios' returns. In turn, clients are increasingly demanding tail risk measures from their managers.

Unfortunately, the traditional portfolio risk measure, the standard deviation, gives similar weight to a loss as to a gain. In addition, the standard deviation does not adequately measure the likelihood of tail events, so using the standard deviation to measure a portfolio's risk fails to adequately measure portfolio risk for managers and their clients.

Many investors measure portfolios against an index or benchmark. For these investors, less attention is given to the portfolio's absolute return than to the portfolio's return difference (i.e., tracking error) versus the benchmark. Again, clients are more sensitive to negative tracking errors than positive ones, and are very sensitive to large deviations from the benchmark. Traditionally, portfolio risk in this context has been measured by the portfolio's standard deviation of tracking errors (or, tracking error volatility—"TEV"). Once again, the standard deviation falls short of being an adequate measure of portfolio tail risk.

So what is a portfolio manager to do? There are other portfolio statistics that can capture the asymmetry or extreme behavior of a portfolio's returns or tracking error. However, to correctly measure these statistics a way must be found to fully represent a portfolio's (and its benchmark's) expected return performance—that is, the expected distribution of a portfolio's returns and tracking errors over the next month. With such a distribution in hand, a portfolio manager can then measure the likelihood of extreme outcomes with greater accuracy.

One goal of the Tail Risk Model and embodiments based thereon is to give portfolio managers a more complete description of their portfolio's return and tracking error distribution. From this distribution, several measures of tail risk: Value at Risk (VaR) and Expected Shortfall (ES) may be calculated. In an embodiment, the Tail Risk Model is integrated into Lehman's multi-factor Global Risk Model, which has provided investors with reliable measures of a portfolio's tracking error volatility. Using selected embodiments of the present invention, investors can obtain a portfolio's TEV, VaR and ES, and also can use the portfolio's (and benchmark's) entire return distribution to obtain any other desired risk measure, all within the same consistent modeling framework. In addition, managers can use the Tail Risk Model to respond to client and regulatory demands for more rigorous modeling of portfolio tail risk.

In Part I of the Detailed Description below, we describe preferred methodology for modeling a portfolio's complete distribution of monthly returns and tracking errors. In Part I we provide an overview and some of the intuition supporting our tail risk methodology, and highlight some of the advantages provided by our modeling approach. We then present several applications of the model and describe and interpret the enhanced portfolio risk reports produced by the Tail Risk Model.

In Part II of the Detailed Description we provide a detailed analytical description of the Tail Risk Model and embodiments based thereon.

Portfolio Tail Risk—Examples

Using standard deviation or tracking error to sufficiently express portfolio risk implicitly assumes that the portfolio's returns follow a normal distribution. This assumption is approximately correct if (a) the individual positions in the portfolio are normally distributed, or (b) the portfolio is sufficiently diversified: indeed, due to the law of large numbers, the distribution of a large portfolio of independent positions approaches the normal distribution regardless of the distribution of the individual positions.

However, portfolio returns can significantly deviate from normality; credit asset returns provide a good example. Most of the time, a credit portfolio will produce a return slightly above a corresponding duration-matched Treasury portfolio. However, occasionally there is an event which can produce substantial portfolio losses. FIG. 1 presents the distribution of monthly excess returns for the U.S. Corporate Baa Index from August 1988 through July 2007. This is a broad, well-diversified index (425 issuers with 1,223 issues as of August 2007). Yet, as seen in the chart, even for such a diversified index its distribution of excess returns is quite different from a corresponding normal distribution with the same mean and standard deviation.

Since 1988, six of the 228 (2.63%) monthly excess return observations are lower than 2.5 standard deviations below the mean monthly excess return. If the monthly excess returns were normally distributed with the same mean and standard deviation as the empirical sample, only 1.4 of the 228 (0.62%) of the observations would be this low. The distribution of Baa excess returns displays fat negative tails, despite the fact that the portfolio is very well diversified and the returns are over a very long period of time.

For credit portfolios, the deviation from normality usually becomes accentuated as the portfolio becomes less diversified or of lower quality. FIG. 2 shows the distribution of monthly excess returns for the Utility Baa Index since August 1997. For this somewhat less-diversified index (101 issuers with 268 issues as of August 2007) its distribution of excess returns differs even more from a corresponding normal distribution with the same mean and standard deviation.

FIG. 2 shows that since 1997 only one of the 120 (0.83%) observations of the monthly excess return of the Baa Utility Index is lower than 2.5 standard deviations below the mean monthly excess return. If the distribution were normal we would expect about 0.7 such months (0.60%). Clearly, the sample size is too small to draw conclusions about the normality of the distribution, but note that this lowest observation is such an extreme tail event—a monthly excess return for July of 2002 of −14.25%, or 8.5 standard deviations below the mean, arising from the turmoil of the California energy crisis—that it is highly unlikely to ever occur if returns were normally distributed. Indeed, a normal model would predict that such an extreme observation would occur only once every 87 trillion centuries, equal to about half a million times the lifetime of the universe.[1]

[1] What we actually show here is that the unconditional distribution of excess returns cannot possibly follow the normal distribution. Beyond the obvious fact that excess returns depend on spread duration, there may be other variables which affect the distribution of excess returns. One such variable distribution of excess returns normalized by duration and spreads, the July 2002 return is still 7.2 standard deviations below the mean, implying a frequency of once in every 14 lifetimes of the universe under the normality assumption.

Besides credit and other market factors, another significant source of tail risk in a portfolio is derivative instruments such as options. Consider the probability distribution of returns of two alternative strategies.

The first strategy ("asset only") is a long position in a stock. Assume the stock's initial value is $100 and its annualized compounded return has an expected value of 6%, with a volatility of 20%. The second strategy ("covered call", or "derivative") is long two shares of the same stock but is also short six call options with a strike price of $110 expiring in five months.

Let us consider an investment horizon of two months. The P&L's of both strategies have the same expected value ($1.35) and standard deviation ($8.30). If these were the only quantities used to describe the P&L distribution, we would consider these two strategies as equally risky.

FIG. 3 shows the distribution of the P&L at a two-month horizon for each strategy. Of course, as FIG. 3 indicates, these are fundamentally different strategies. While investing in the asset strategy provides a standard return profile with similar exposures to upside or downside risk, the derivative strategy has been structured to provide a small positive return in most scenarios, while eliminating the probability of large positive returns and increasing the probability of large negative returns.

Each strategy's complete risk profile is provided by its entire probability distribution of returns (and any risk model should seek to represent it). Naturally, the left tail of the distribution—the one representing extreme losses—is of particular interest to investors. In order to summarize the information provided by the return distribution with regard to extreme negative returns, portfolio managers typically rely on two measures:

Value at Risk (VaR): VaR is a portfolio's return (or tracking error) threshold value such that the portfolio is expected to outperform this value a specified percentage of the time. VaR is typically reported as a loss, i.e., the negative of the above definition. For example, if a portfolio's tracking error VaR (at a 99% confidence level) is reported as 20 bp, then 99% of the time the portfolio is expected not to underperform its benchmark by more than 20 bp. Alternatively, you could say that the portfolio's tracking error is expected to be worse than −20 bp, 1% of the time. If we represent the probability distribution with a set of, say, 100,000 equally likely scenarios, the 99%—confidence VaR, $VaR_{99\%}$, represents the best among the worst 1,000 scenarios.

Some portfolio managers feel that VaR is an inadequate measure of tail risk because it is only a threshold value and does not provide information about the extent of the losses beyond the threshold value. To highlight this shortcoming, imagine a bond shortly before its maturity that has a small chance to default, say 0.9%, in which case it would be almost worthless. If it does not default, it would be worth 100. If the current value of the bond is 99 and we represent its P&L distribution with 100,000 scenarios, then in 900 of these scenarios the P&L would be −99, and in the remaining 99,100 scenarios it would be +1. The $VaR_{99\%}$ of a portfolio holding this bond—the (negative of) the P&L of the $1,000^{th}$ worst scenario—is −1, a number that completely ignores the possibility of default. In other words, VaR lacks certain fundamental properties that a portfolio manager would expect from a good risk measure.[2]

[2] For a detailed discussion on the subject, please see the seminal Artzner, Delbean, Eber and Heath (1999) paper.

Expected Shortfall (ES). To overcome the shortcomings of VaR, many portfolio managers have turned to another risk measure, Expected Shortfall. ES is defined as the average loss of all the worst-case scenarios beyond the threshold. Using the same example above, in a set of 100,000 equally likely scenarios, the 99%—confidence ES, $ES_{99\%}$, is the average loss among the worst 1,000 scenarios. For the above example, the $ES_{99\%}$ is 89, which gives the portfolio manager a better representation of the potential losses faced in the worst 1% realizations of portfolio performance.

For the example offered in FIG. 3, the asset strategy (long stock) has a $VaR_{99\%}$ of $16 and an $ES_{99\%}$ of $19, while the derivatives strategy (long stock, short calls) has a $VaR_{99\%}$ of $29 and an $ES_{99\%}$ of $40, representing significantly higher tail risk. Thus, even though both strategies have the same expected return and standard deviation, they have very different tail risk.

While credit assets and derivatives are well-known sources of tail risk, there are others that may be less familiar. Indeed, many asset returns exhibit non-normal "fat-tailed" behavior.[3] For example, FIG. 4 presents the empirical distribution of realized one-week changes in the six-month USD Libor rate (in bp) since 1987. FIG. 4 then overlays the normal probability distribution with the same mean and variance as the historical distribution of weekly rate changes.

[3] See Purzitsky (2006).

The empirical distribution is significantly different from the normal distribution. While both have means of about 0 and standard deviations of about 12 bp, the normal distribution would expect weekly moves larger than 40 bp in magnitude to occur roughly twice every 20 years. In contrast, over our 20-year sample period, such moves have occurred 12 times, a frequency six times larger than that implied by the normal distribution.

The above observations have significant implications for portfolio tail risk measurement. The recent turmoil in the credit markets, after a long period of healthy returns and relatively low volatility, provides an illustrative, and cautionary, case study.

In June 2007 the Pan European High Yield Index had a spread of about 210 bp (just above its historical low of 187 bp in May 2007) and a four-year monthly standard deviation of returns of 87.9 bp. Risk models which measure risk by analyzing returns over a rolling historical window would tell a manager that the worst month in the last four years had produced a loss of 150.9 bp (see FIG. 5).

The Lehman Brothers Global Risk Model run on Jun. 29, 2007 estimated the monthly total return volatility of the index to be 84 bp (see FIG. 6, Volatility), in line with the four-year historical estimate. A naïve calculation of tail risk based on this estimate and assuming that the index monthly total return follows the normal distribution would indicate that the average return in the worst 1% of scenarios ($ES_{99\%}$) would be about 218.5 bp below the expected carry of the index (approximately 57 bp/month)—a loss of 161.5 bp, close to the worst monthly loss over the last four years.

However, the estimate of the Tail Risk Model for the average return in the worst 1% of scenarios is 360 bp below the expected carry (FIG. 6, $ES_{99\%}$)[4], i.e., a loss of 303 bp—about double the size of the naïve estimates. In July 2007 the index experienced a loss of 340 bp, 37 bp lower than the 99% prediction of the Tail Risk Model, but more than double the amount of the other estimates.

[4] Notice that the Tail Risk Model reports both VaR and ES as losses net of carry. To estimate the predicted magnitude of losses the expected carry must be subtracted from VaR or ES.

Thus, our risk model is able to produce a reasonable estimate of extreme losses while at the same time producing a volatility estimate that is consistent with recent history.

(a) In an embodiment comprising a Tail Risk Model, the first step is to decouple regular volatility—typically consistent with recent history—from tail risk, which is driven from extreme infrequent events like market crashes and defaults.

(b) The second step of an embodiment is to scan as much history as possible for the occurrence of such events. Indeed, if we take a look at the full history of the index (FIG. 7), we discover a wildly volatile period in the early 2000s. The full sample estimate for the total return volatility is 295 bp and the worst observed loss is 1008 bp.

(c) However, estimating tail risk with simple risk measures based on the relatively short full history of this index would overestimate the true exposure to extreme losses, since almost half of the historical observations come from the extraordinarily volatile period of 2000-2003. The third step of an embodiment entails the use of a model that has the richness to adapt to low regular volatility and at the same time allow for the possibility of large extreme losses. Our model allows separate calibration of the tails of the returns distribution to the entire history of returns, while the body of the distribution can be calibrated to recent history. In addition, our default risk model accounts for the possibility of default events that further drive extreme losses without a commensurate effect on regular, i.e. normal market, volatility.

(d) The final step of an embodiment is to ensure that historical results are interpreted in their proper context. For example, we know that the risk of credit securities increases with the level of spreads. Although spread levels of the Pan European High Yield Index skyrocketed to 1000+ bp during the volatile period after the turn of the century, recent spreads are significantly lower, so we reduce our current estimates of risk commensurately. Further, since the history of this index is short, we may have to adjust the estimated frequency of extreme events (and as a result the probability of extreme losses) to make it more consistent with that of similar indices with a longer history.

Tail Risk Modeling Framework

The Tail Risk Model builds on the risk modeling framework of the Lehman Global Risk Model.[5] Intuitively, the Global Risk Model first decomposes a bond's return into changes in risk factors and the bond's "loading" or "exposure" to each risk factor. For example, an intermediate USD bond is likely exposed to changes in the 5-year UST key rate (a risk factor) and its exposure to that risk factor is the bond's 5-year key rate duration. The Global Risk Model identifies the factors (both systematic and security-specific) and exposures (e.g., KRD and OASD) that drive individual bond, and, hence, monthly portfolio return volatility.

[5] See Dynkin, Joneja, et al (2005).

In an embodiment, factors are identified that exhibit stability in their behavior over time. In other words, we want to be as certain as possible that the historical behavior of a risk factor is likely to be its behavior going forward. In an embodiment using the Lehman Index database, statistical techniques known to those skilled in the art are employed to generate long time series of historical observations for each of these factors as well as their volatilities and correlations with other factors.

To generate a complete distribution for each factor, the Tail Risk Model also treats each risk factor as a random variable. However, we do not necessarily assume it is a normal random variable. Instead, we find a distribution (typically a "fat-tailed" t-distribution) that best describes each factor's historical behavior, including its tail behavior.

Of course, it is possible that in our sample history for any given factor there is an absence of extreme events. However, this does not necessarily imply that an extreme event will never occur. Similarly, an occurrence of a recent extreme event does not imply that it will continue occurring with the same frequency. To deal with these circumstances, in an embodiment we use an estimation technique that imposes structure on each risk factor in order to make use of all available data as much as possible. Given the rarity of extreme events, our estimation of tail risk preferably makes use of the entire available history. However, since the bulk of a risk factor's distribution (i.e., non-extreme events) represents "regular" risk in a normal market environment, our estimate of a factor's regular market behavior preferably relies more heavily on recent history, as opposed to an equal weighting of all historical observations.

Having specified the behavior of risk factors, the Tail Risk Model generates a security's return distribution by conducting many simulations, or "draws", from the factors' distributions. For example, for one simulation or draw, we sample from each of the security's risk factors (including security-specific risk). In other words, we make a random draw from each risk factor's fitted distribution. After incorporating the correlation among the risk factors, we then multiply these "simulated" factor observations by the bond's current corresponding factor exposures. Summing across the products of all the security's risk factors multiplied by their factor exposures, we arrive at the security's total return for this one particular scenario. We then preferably repeat this simulation many thousands of times to generate an entire distribution of possible returns for the bond.

For a portfolio, the Tail Risk Model conducts this exercise for all the securities in the portfolio and then aggregates the results scenario by scenario to get the entire return distribution for the portfolio. To produce the portfolio's entire tracking error distribution, we also perform the same simulation for the portfolio's benchmark and take the difference in returns (portfolio minus benchmark) for each simulation run.

In an embodiment, once we have generated the entire distributions for total return and tracking error we can easily calculate Volatility, VaR, ES and any other risk measure at any chosen confidence interval. Further, the Tail Risk Model preferably breaks down portfolio risk into additive contributions of various risk factors, allowing portfolio managers to quickly identify sources of tail risk in the portfolio and see if it matches their desired risk profile. This is an invaluable tool for portfolio and risk managers, helping them to better understand portfolio risk and to be better prepared to respond to ever-increasing regulatory scrutiny.

Several regulatory jurisdictions have issued guidelines for the measurement of portfolio tail risk.[6] The Tail Risk Model is generally consistent with such guidelines and has the flexibility to adapt easily to specific interpretations.

[6] See e.g., European Union (2004) and (2005) and Elvinger et al. (2003)

In one aspect, the invention comprises a computer-implemented method comprising: (i) electronically receiving data describing one or more risk factors driving volatility of each of a plurality of securities comprised in a specified portfolio; (ii) for each of the plurality of securities, categorizing each of the risk factors as a random variable and identifying a distribution that best fits each risk factor's historical behavior; and generating a return distribution for the security, based on the best fit distributions; and (iii) aggregating the security return distributions to generate a return distribution for the specified portfolio.

In various embodiments: (1) for each security, generating the return distribution comprises sampling a value from each risk factor's best fit distribution; (2) for each security, generating the return distribution comprises: (a) sampling a value from each risk factor's best fit distribution; (b) conducting a simulation based on a scenario defined by the sampled values; (c) incorporating a correlation among the risk factors; (d) multiplying the sampled values by corresponding factor exposures to obtain a product for each risk factor; (e) summing the risk factor products for the scenario; and (f) repeating steps (a)-(e) for a plurality of scenarios; (3) the method further comprises performing steps (a)-(f) for each security in a benchmark portfolio to generate a return distribution for the benchmark portfolio; (4) for each of the plurality of securities, generating the return distribution comprises weighting each risk factor's more recent historical data, as represented by time series data, more heavily than more distant historical data; (5) the method further comprises generating a tracking error distribution for the specified portfolio by calculating a difference between a return distribution for the specified portfolio and a return distribution for the benchmark portfolio, and aggregating the return distributions; (6) the method further comprises calculating value at risk for the specified portfolio based on the return distribution for the specified portfolio and the tracking error distribution; (7) the method further comprises calculating expected shortfall for the specified portfolio based on the return distribution for the specified portfolio and the tracking error distribution; (8) the method further comprises calculating volatility for the specified portfolio based on the return distribution for the specified portfolio and the tracking error distribution; (9) the aggregating step comprises linearly combining systematic, idiosyncratic, and default returns; (10) the idiosyncratic return for a portfolio is a linear combination of returns for sub-portfolios related to correlation clusters; (11) the aggregating step comprises aggregating an idiosyncratic return component; and (12) the aggregating an idiosyncratic return component comprises subdividing the portfolio according to correlation clusters and aggregating the clusters according to an entropy-based algorithm.

Other aspects of the invention comprise analogous software and computer systems.

BRIEF DESCRIPTION OF THE DRAWINGS

FIG. 1 depicts Distribution of Monthly Excess Returns; U.S. Corporate Baa Index vs. Normal Distribution; August 1988-July 2007.

FIG. 2 depicts Distribution of Monthly Excess Returns; U.S. Corporate Baa Utility Index vs. Normal Distribution; August 1997-July 2007.

FIG. 8 depicts a Portfolio and Benchmark Comparison: Traditional Portfolio with U.S. Aggregate Benchmark.

FIG. 9 depicts an exemplary VaR Summary for the Traditional U.S. Aggregate Portfolio.

FIG. 10 depicts VaR Systematic Details for the Traditional U.S, Aggregate Portfolio.

FIG. 11 depicts VaR Default Details for the Traditional U.S. Aggregate Portfolio.

FIG. 12 depicts Credit Tickers in the Traditional U.S. Aggregate Portfolio.

FIG. 13 depicts a VaR Summary Report for the U.S. High Yield Index.

FIG. 14 depicts VaR Default Details for the U.S. High Yield Index.

FIG. 15 depicts a Market Structure Report for the Negatively Convex Portfolio.

FIG. 16 depicts a VaR Summary Report for the Negatively Convex Portfolio.

FIG. 17 depicts VaR Systematic Details for the Large Convexity Portfolio.

DETAILED DESCRIPTION OF EMBODIMENTS

Figure 3:
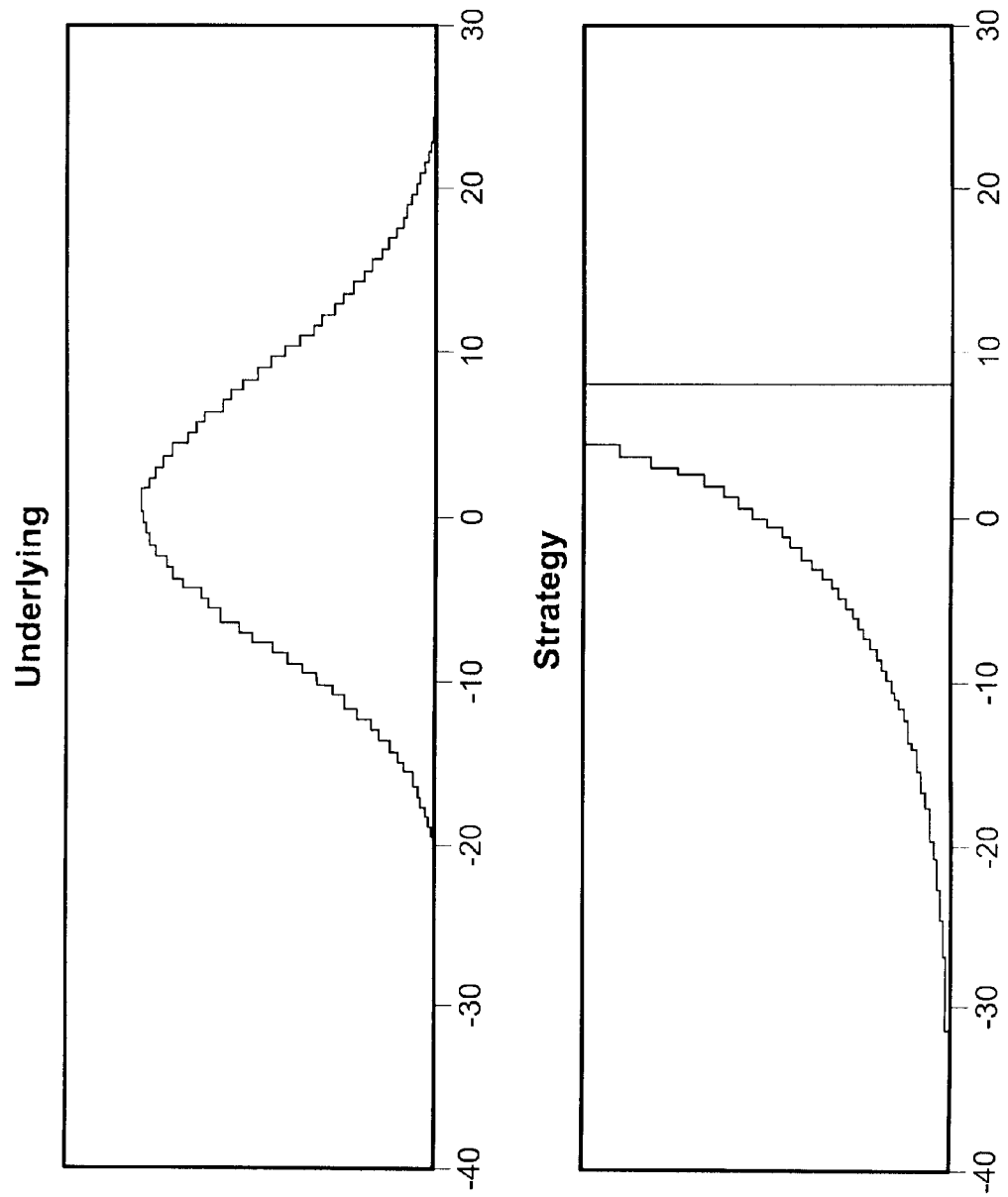
FIG. 3 depicts P&L Distributions for "Asset Only" and "Derivative" Strategies.
Figure 4:
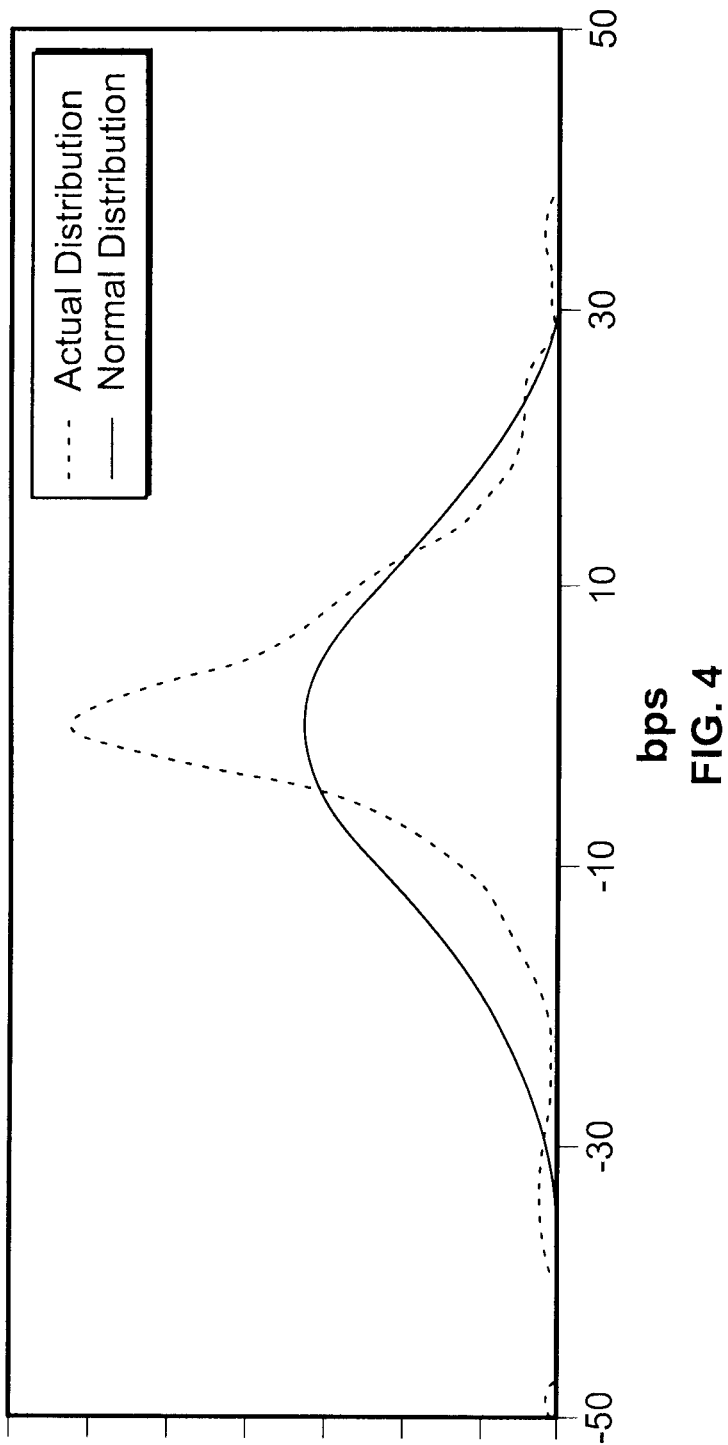
FIG. 4 depicts Weekly Changes in Six-Month USD Libor: Actual vs. Normal Distribution; 1987-2007.
Figures 5, 6:
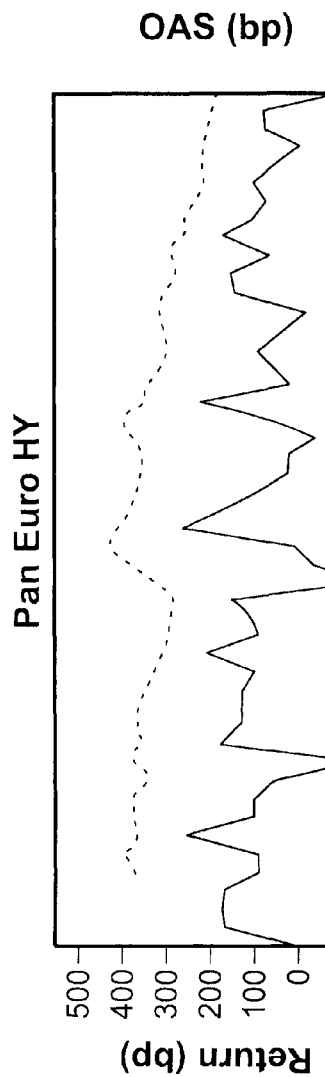
FIG. 5 depicts Pan Euro High Yield Index OAS and Monthly Total Return (July 2003-June 2007).
FIG. 6 depicts Risk of the Pan Euro HY Index vs. cash on Jun. 29, 2007, according to an embodiment of the Tail Risk Model.
Figure 7:
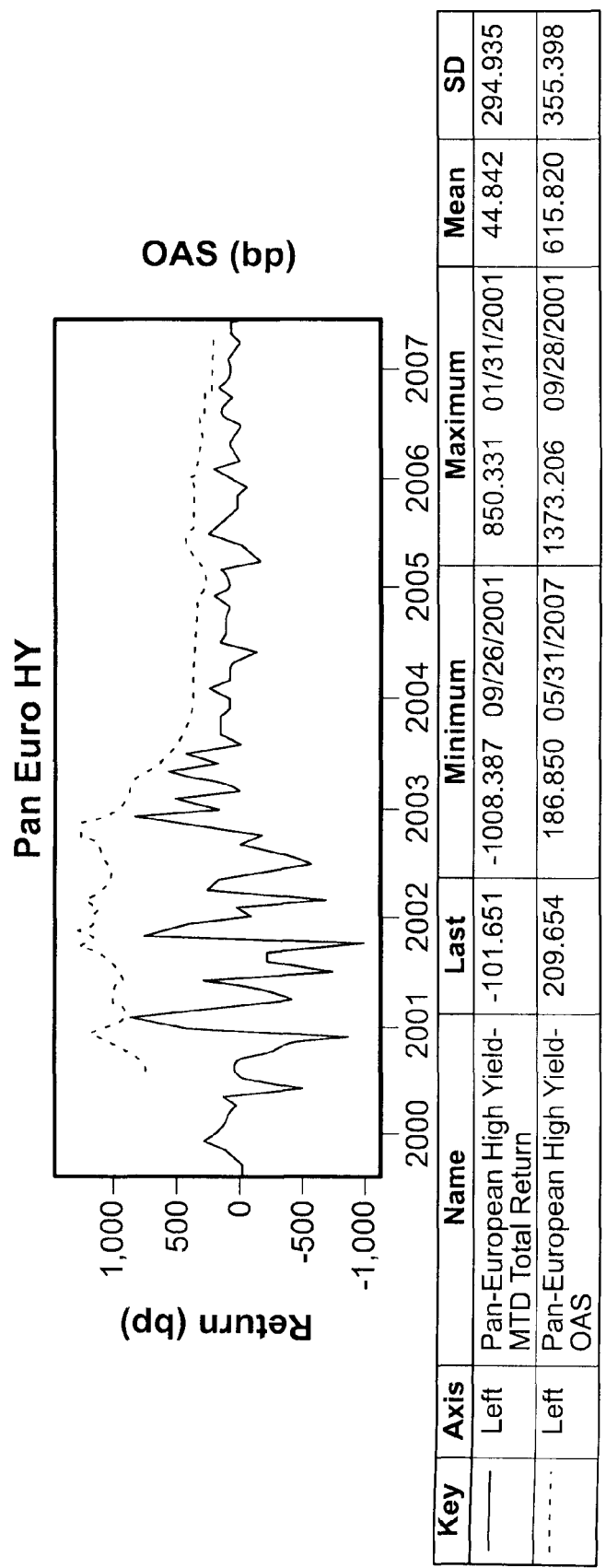
FIG. 7 depicts Pan Euro High Yield Index OAS and Monthly Total Return (July 1999-June 2007).

As mentioned above, Part I of this description illustrates the Tail Risk Model's reports for several portfolios, first for a portfolio benchmarked against the Lehman Brothers Global Aggregate Index. We then discuss the tail risk report for the U.S. High Yield Index against a cash benchmark. Our final example is a highly skewed, highly non-normal negatively convex portfolio, which allows us to highlight the flexibility of our Tail Risk Model.

Part II discusses embodiments based on our tail risk models. In order to obtain the distribution of a portfolio's return (or P&L), four steps are preferably performed: identification of risk factors; pricing the securities at the investment horizon; producing a portfolio return distribution by aggregating the securities' distribution; and summarizing the wealth of information contained in the return (or P&L) distribution by means of a few significant statistics. We describe each step in detail.

Part I: Portfolio Applications

The best way to become familiar with the Tail Risk Model is to review the model's risk reports. We present and discuss illustrative risk reports for three different illustrative types of portfolios.

The first example is a traditional long-only cash portfolio benchmarked against the Lehman U.S. Aggregate Index. We walk through each section of the report and relate specific output to the corresponding equations presented in Part II of this description. The second example is the U.S. High Yield Index benchmarked against cash. In the third example, we construct a very negatively convex portfolio to highlight how tracking error volatility alone is not sufficient to properly describe risk. Instead, the measures provided by the Tail Risk Model, namely VaR and ES in this example, provide a much more accurate description of the portfolio's return (P&L) distribution and possible extreme behavior.

2. Measuring the Tail Risk of a Large, Diversified Portfolio

Here we examine a sample tail risk report for a traditional long-only cash portfolio benchmarked against the U.S. Aggregate Index.

FIG. 8 depicts sector composition for the portfolio and the benchmark, along with their differences, which represent the net exposures of the portfolio. The portfolio is underweighted in the Securitized sector, overweighted in Treasuries/Agency/Munis, and it includes a significant exposure to the out-of-index risky sector of High Yield Credit.

2.1. VaR Summary Report

FIG. 9 depicts an exemplary VaR Summary Report, which gives the overall risk, as well as the breakdown of risk into systematic, idiosyncratic, and default risk components. The systematic risk component is further broken down into contributions from broad sub-categories of risk factors such as currency and yield curve. There preferably are three separate panels with the same structure to present information on three different universes: "Portfolio vs. Benchmark," "Portfolio," and "Benchmark." At the bottom of the page are histograms of the three total return simulations.

The first row of the report depicted in FIG. 9 is expressed in P&L space, which is obtained by scaling the basis point returns by the beginning market value of the portfolio. All other numbers in the table are presented in return space (in bp).

Numbers reported in the large first block of rows are contributions to risk as defined in Section 9 below. These contributions (in bp) provide an easy and intuitive way to identify the main drivers of tail risk. By definition, contributions from all the individual categories of risk sum to the total risk. So, for example, all the contributions to Volatility of tracking errors (i.e., the "Portfolio vs. Benchmark" universe) sum to 20.5 bp. The second block of rows reports isolated systematic, idiosyncratic, and default risks. In an embodiment, independence between these three categories is assumed. The last row of the report shows the monthly carry return for each universe.[7]

[7] The monthly carry is calculated as the annual yield-to-worst divided by 12.

Within each of the three panels, the first column reports the contribution to volatility (see equation (50)). In this example, the volatility of the net return (or tracking error volatility, TEV) is 20.5 bp and mainly comes from the systematic risk factors (18.5 bp).[8] The second column shows the VaR and its breakdowns (see equation (54)). In this example, the $VaR_{99\%}$ is 46.7 bp, which means that among the worst 1% of the scenarios (i.e., simulation runs), the best net return (i.e., the "best-worst return") is −46.7 bp.[9] Unfortunately, VaR (2) does not give us much information about what is happening in those worst 1% of scenarios. This is why the Expected Shortfall value is useful. The ES (3) summarizes the average net return of all those 1% worst-case scenarios. The total ES and contributions to ES by various blocks of factors (see Equation (57)) are reported in the third column. In this example, $ES_{99\%}$ is 54.3 bp.

[8] The systematic risk contribution to TEV (18.5 bp) differs from the isolated systematic risk (19.4 bp) at the bottom of the report. Since the systematic and idiosyncratic TEVs are assumed to be uncorrelated, the total TEV must include a diversification benefit from combining uncorrelated risks. The systematic risk contribution to TEV includes the part of the diversification benefit that is assigned to the systematic TEV (−0.9 bp).

[9] Note that reported VaR and ES are all returns exclusing carry. Therefore, to get the total return, carry should be added back. For simplicity, we refer to ex-carry return as return.

Using the breakdown of contributions, we can drill down and find the main sources of TEV and tail risk. For example, for this particular portfolio, the yield curve is the largest contributor to tracking error Volatility, VaR, and ES. Credit and Agency Spreads and MBS/Securitized factors also contribute significantly to the systematic tracking error risk.

It is interesting to note in FIG. 9 that credit spreads (3.9 bp) and default risks (0.3 bp) together contribute roughly 20% to overall TEV (4.2 bp/20.5 bp) but contribute approximately 28% of the net return $ES_{99\%}$ (15.2 bp/54.3 bp). This is not surprising as the portfolio has a meaningful overweight to high yield credit (see FIG. 8) which is well known for its tail risk. For the same reason, default risk contributes much more to net return VaR (1.8 out of 46.7 bp=3.9%) and ES (4.2 out of 54.3 bp=7.7%) than to TEV (0.3 out of 20.5 bp=1.5%). These results suggest that credit and default risk may not be sufficiently captured by volatility and that a portfolio manager would be well-served to examine the VaR and ES to better evaluate the risk of holding high yield in a portfolio managed against an Aggregate mandate.

Estimated distributions are plotted at the bottom of FIG. 9 separately for each universe. For this well-diversified aggregate portfolio, the distributions of all the universes are bell-shaped and are close to a normal distribution. Volatility, VaR, and ES are highlighted on the plots. Since we plot the returns instead of losses, both 99%—confidence $VaR_{99\%}$ and $ES_{99\%}$ fall on the left tails.

2.2. VaR Systematic Details Report

To help managers drill down into the contributions of particular systematic risk factors, in an embodiment we provide a VaR Systematic Details Report (see FIG. 10). This report preferably lists all of the portfolio's and benchmark's active risk factors. The length of this report varies depending upon the portfolio and benchmark holdings which determine the set of active risk factors to display. Risk factors are grouped into broad categories for ease of navigating the report.

In this example, the VaR Systematic Details Report expands to four pages. To save space, we present in FIG. 10 a truncated version of the report containing factors with relatively large contributions to VaR. This report is structured in a way that is very similar to the VaR Summary Report. The only difference is that besides absolute contributions to TEV, VaR and ES, we also report the contributions as percentages.

Since Yield Curve, Credit and Agency Spreads, and MBS/Securitized factors are the main contributors to the systematic risk, we will drill down into these three categories. Under the "Key Rates and Convexity" category, the 10-year key rate is the largest contributor to all three risk measures. The Convexity factor contributes only 0.4% to TEV, but it has large negative contribution to VaR and ES (−8.2% and −9.2% respectively). This is due to the asymmetric nature of this risk factor, which we will explore in our third portfolio example. Under the "Credit Non-Distressed Spread & Vol." category, USD High Yield Industrials is the biggest contributor. This out-of-index portfolio position in USD high yield industrials contributes about 9% to TEV, $VaR_{99\%}$ and $ES_{99\%}$, which is consistent with the market value allocation displayed in FIG. 8 (i.e., the portfolio has an overweight to USD HY Industrials). Under the "MBS Spread & Vol." category, "USD MBS Seasoned Discount" is the top contributor to risk.

2.3. VaR Default Details Report

The VaR Default Details Report (see FIG. 11) presents contributions of default risk to Volatility, $VaR_{99\%}$, and $ES_{99\%}$ for the top 15 issuer tickers.[10] Tickers are sorted by contribution of default risk to TEV. For our portfolio, Continental Airlines (CAL), Bowater (BOW) and Gaylord Entertainment (GET) are the main contributors to tracking error arising from default risk. For this portfolio, overall default risk is relatively low.

[10] N-15 by default, but a user can change this value.

FIG. 12 depicts a report that lists all credit tickers in the portfolio in order of their isolated idiosyncratic (i.e., non-default) volatility. We model a security as having idiosyncratic risk in non-default circumstances as well as default risk. In this report, there are two investment-grade Continental Airlines (CAL) bonds in the portfolio (rated BAA2/BAAI/BA2) with combined market value weight of 2.7% versus a weight of only 0.03% in the U.S. Aggregate. This large CAL overweight leads to the large contribution of CAL to idiosyncratic risk.

The BI-rated Bowater (BOW) and the B3-rated Gaylord Entertainment (GET) are both out-of-index investments with respective weights of 0.58% and 0.31%. Their large contribution to default risk is driven by both the overweight and the low ratings. In general, a portfolio manager should have pretty strong views on tickers that contribute significantly to default and idiosyncratic risk.

3. Tail Risk of the U.S. High Yield Index

In this section, we discuss the tail risk report of the U.S. High Yield Index against USD cash. A portfolio manager can use the Tail Risk Model to compare a portfolio versus an index, a portfolio versus another portfolio, or and index versus another index.

In FIG. 13, which depicts a VaR Summary Report, we observe that the return distribution for this index is bell-shaped with Volatility of 97 bp, $VaR_{99\%}$ of 257 bp, and $ES_{99\%}$ of 309 bp, for the portfolio vs. benchmark universe. This is not a normal distribution. If it were normal, given a volatility of 97 bp, the $VaR_{99\%}$ and the $ES_{99\%}$ would have been about 226 bp and 252 bp, respectively. These numbers are significantly smaller than those reported.

As far as systematic risk is concerned, we see from the VaR Summary Report that the yield curve is a major contributor to all the tracking error risk measures (a result of the benchmark being cash). As expected, credit spreads and distressed credit also contribute significantly to systematic risk.

When we analyze the contributions of systematic, idiosyncratic and default risk we observe that while default risk contributes little to Volatility ($7.4/97 \approx 8\%$), it constitutes a significant part of both $VaR_{99\%}$ ($49.2/257 \approx 19\%$) and $ES_{99\%}$ ($95.7/309 \approx 31\%$). This happens because defaults are very asymmetric in nature, producing a lot of tail risk: most of the time there are no defaults, but occasionally a big loss occurs (see equation (19)). Therefore the effect of default events is more pronounced deep in the tails than in the body of the P&L distribution.

Because of the large number and diversity of issuers in the index (780, with a total of 1,594 issues), the idiosyncratic risk contribution to overall tracking error risk is relatively small, but not negligible (contributing 2.9 bp to Volatility, 6.3 bp to $VaR_{99\%}$ and 6.3 bp to ES99%). Notice that the contribution of idiosyncratic risk to $ES_{99\%}$ is equal to its contribution to $VaR_{99\%}$. This does not mean that the isolated $ES_{99\%}$ of idiosyncratic risk is equal to the isolated $VaR_{99\%}$, (54.9 bp vs 43.6 bp, respectively, as can be seen in FIG. 13). The reason is that the size of risk contribution of each risk source depends on the risk contributions of the other sources. As we move from the VaR risk measure to ES, default risk becomes relatively more prominent relative to the other contributors to risk (systematic and idiosyncratic risk), reducing the magnitude of their respective contributions.

To identify the specific names that contribute to default risk, we look into the "Default Details" report (FIG. 14). The top fifteen contributors to the default risk of the U.S. HY index are listed in descending order of contribution to tracking error Volatility arising from default risk. For this index, Ford (F) is the largest contributor to default risk in all three risk measures, especially ES. This is the result of a combination of F's large market value weight in the index (5.8%) and its current low rating (B1/B2), which implies a significant default probability. In addition, F's contribution to default volatility is 28.3%, whereas its contribution to $ES_{99\%}$ arising from default is 52.9%.

Why such a big difference in the contribution? Volatility is a risk measure calculated over all potential outcomes (scenarios). All positions that may produce credit losses—large or small—contribute to default volatility. On the other hand, $VaR_{99\%}$ and ES99% are measured over the worst 1% of outcomes where naturally the positions with the biggest exposure to default losses (because of the combination of position size, default probability and recovery rate) are disproportionately represented. Indeed, scenarios with default losses coming from small positions or positions with low default probability or high recovery rates may not even appear in the worst 1% of scenarios. Such positions will have zero contribution to tail risk, allowing the riskier positions to contribute a larger percentage to tail risk.

4. Tail Risk of a Negatively Convex Portfolio

In this section, we analyze the risk of a portfolio with very large negative convexity. Such a portfolio would typically display a "non-normal" asymmetric return profile. A bond that is negatively convex has the property that its duration increases as interest rates rise and its duration decreases as rates fall. Consequently, for similar up and down moves in rates, the bond's positive returns will be smaller in magnitude than its negative returns. As we will see, the tracking error volatility alone is not sufficient to capture the risk of this portfolio: VaR and ES are indispensable for understanding portfolio risk.

We consider a portfolio consisting of three securities from the U.S. Agency Index with large negative convexity. The OAC (option-adjusted convexity) of the portfolio is −5.01. We assume the benchmark for this portfolio is the Agency Index itself, with a convexity close to zero (0.08). The portfolio bonds are callable securities and their returns will be influenced by changes in the implied volatility risk factors, which have an impact on the value of the embedded call options in the bonds.

The portfolio's returns will also be driven by the convexity risk factor (one of the yield curve risk factors) which captures the impact of realized average changes in yield. While most risk factors have a symmetric impact on a portfolio's returns and tracking error, this is not true if there is a large net convexity exposure. For example, if a portfolio is duration neutral but more positively convex than its benchmark, it will outperform if interest rates move up by a small amount and also outperform if rates move similarly in the opposite direction. Consequently, a portfolio with net positive convexity will contribute a positive return owing to convexity, regardless of the direction of the yield curve movement, which skews the tracking errors to be greater than zero.

However, the opposite is true for a portfolio that is duration neutral but more negatively convex than its benchmark. If rates decline, the portfolio's net duration exposure decreases, leading to smaller returns compared to the benchmark (i.e., negative tracking errors). If rates increase, the portfolio's net duration exposure increases leading to larger negative returns compared to the benchmark (i.e., also negative tracking errors). Consequently, although changes in rates are roughly symmetrical, the portfolio's net negative convexity skews the tracking errors to be less than zero. When a portfolio's net convexity exposure is an important driver of its return, the distribution of its total returns and tracking errors will show strong skewness. In such cases, TEV alone cannot give a sufficient description of the portfolio's risk exposure.

The Market Structure Report depicted in FIG. 15 shows the curve exposure of the portfolio relative to its benchmark. Overall, the portfolio has a slightly shorter duration than the benchmark and roughly matches the key rate exposure of the benchmark. However, there is a large convexity mismatch. The portfolio has an OAC of −5.01 compared to 0.08 for the benchmark. As discussed above, we expect both the net return and the portfolio return to show negative skewness.

Indeed, we can see at the bottom of the VaR Summary Report depicted in FIG. 16 that the net return distribution is clearly negatively skewed. The total volatility is 17.9 bp. Had the return distribution been normal, the volatility would have an implied $VaR_{99\%}$ of 46 bp. Instead, the $VaR_{99\%}$ from the Tail Risk Model is 73.5 bp, almost double.

Given the nature of the portfolio, this display of asymmetrical net returns is not surprising. Where is the TEV and tail risk coming from?

First, yield curve factors are the dominant risk factors, which can be seen from the VaR Summary Report (FIG. 16). For the "Portfolio vs. Benchmark" universe (i.e., tracking error) the yield curve factors contribute 12.5/17.9=69.8% to TEV, 59.8/73.5=81.4% to $VaR_{99\%}$ and 80.8/95.9=84.3% to $ES_{99\%}$. However, as can be seen in the Market Structure Report (FIG. 15), the portfolio and the benchmark have somewhat similar OAD and key rate profiles. So what is the source of this yield curve risk? FIG. 17 depicts a VaR Systematic Details Report that provides more detail about the yield curve factors. In addition to the key rate risk factors, another yield curve risk factor is "convexity", which measures the impact on the portfolio of the average change in interest rates. For tracking errors, the convexity factor contributes 58.3% to systematic Volatility, 78.3% to $VaR_{99\%}$ and 81.7% to $ES_{99\%}$, whereas the individual net key rate exposures as a group are, as expected, a much smaller source of risk. For the portfolio returns alone (i.e., not tracking errors), the contribution of the convexity factor drops sharply (3.5% for Volatility, 22.4% for $VaR_{99\%}$ and 25.7% for $ES_{99\%}$) because the key rate exposures are larger, as they are no longer netted against the benchmark. Therefore, as expected, the convexity yield curve factor plays a much larger role for the "Portfolio vs. Benchmark" universe than for the "Portfolio" universe.

The volatility risk factors also are significant contributors to tracking error risk (3.8/17.9=21.2% to TEV, 12.6/73.5=17.1% to $VaR_{99\%}$ and 14.6/95.9=15.2% to $ES_{99\%}$). In contrast, for the portfolio return risk (i.e., not net of the benchmark), yield curve factors are a much more dominant risk contributor (72.3/69.5=104.0% to TEV, 224.9/214.3=104.9% to $VaR_{99\%}$ and 273.2/261.1=104.6% to $ES_{99\%}$), while the volatility risk factors in fact help to reduce risk (−6.7/69.5=−9.6% to TEV, −17.9/214.3=−8.4% to $VaR_{99\%}$ and −20.8/261.1=8.0% to $ES_{99\%}$). Note that a number larger than 100% for the yield curve factors is possible because volatility has a negative contribution—in other words, volatility represents a "hedge" for portfolio returns. However, while the portfolio's volatility exposure has a risk reducing impact on portfolio return, volatility has a meaningful contribution to the risk of the portfolio against the benchmark.

From this example, an important point is that it is unwise to rely only on TEV to measure risk when certain risk exposures that can produce asymmetrical returns play a large role in driving a portfolio's risk and return. Several of the derivative instruments widely used in today's portfolio management have markedly asymmetric return distributions. The addition of these instruments can often drastically alter the risk and return profile of a traditional portfolio. It is worthwhile for a portfolio manager to have the additional information provided by VaR and ES to obtain a better understanding of the portfolio's risks.

Part II: Tail Risk Modeling Framework

5. Steps of the Risk Modeling

Figure 18:
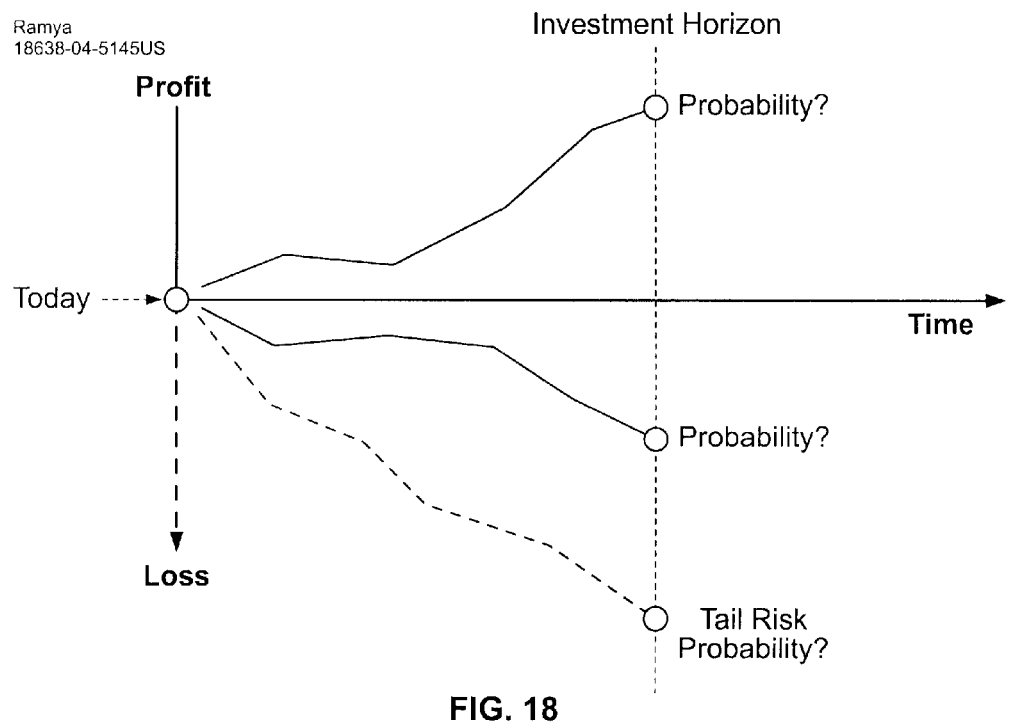
FIG. 18 illustrates a Purpose of a Risk Model: the P&L Distribution.

Portfolio managers and traders need to monitor the probability distribution of their returns or P&L associated with their investment strategies (see FIG. 18). In order to deliver and interpret the P&L distribution, four steps typically are necessary.[11] Differences in tail risk models arise from different approaches to implementing these four steps.

[11] See Meucci (2005) for more details.

Step 1. "Identifying Risk Factors": Generating their Joint Distribution

While security returns display a random behavior, we must identify the risk factors that drive this erratic behavior. These sources should display a similar behavior across different time periods, in such a way that we can learn about the future from the past—in other words, these risk factors should constitute "invariants" of the market.[12]

[12] When measuring a portfolio's return net of its benchmark's return, the standard deviation is known as tracking error volatility.

For example, in the Treasury market an appropriate set of risk factors are key-rate changes over non-overlapping time periods.

Once the risk factors (or, invariants) have been identified, their joint distribution needs to be estimated from the available history of data and represented in a tractable way.

Regarding estimation, one can use either parametric or non-parametric approaches. The fully non-parametric approach models the joint distribution of the factors in terms of their realized empirical distribution: under this distribution, only past joint occurrences of the factors can take place in the future and the probabilities of all these outcomes are equal. Alternatively, the parametric approach models the joint distribution of the factors in terms of a parsimonious, analytical multivariate distribution. Typically, this distribution belongs to the elliptical family of which the normal distribution is a member.

For instance, as a first approximation, and neglecting such features as "fat tails," the key-rate changes over non-overlapping time periods can be modeled as a jointly normal distribution.

Regarding the representation of the market distribution, one can either opt for an analytical representation or for a scenario-based representation. In the analytical approach, the distribution is described by a mathematical formula. In the scenario-based approach, the market distribution is represented by a discrete set of scenarios. These scenarios are not necessarily historical realizations but often are Monte Carlo simulations generated under analytical, semi-parametric, or fully non-parametric assumptions.

For instance, a normal distribution can be represented analytically in terms of its probability density function which involves the exponential function; alternatively, it can be represented by a large set of simulations. Similarly, the realized empirical distribution can be represented by a formula; alternatively, it can be represented by the historical realizations themselves, or by a larger set of simulations bootstrapped from the historical realizations.

The most suitable choice among the above approaches is dictated by the nature of the market being estimated and modeled. The Tail Risk Model preferably maintains the extensive security coverage of the Lehman Global Risk Model. Security types supported in an embodiment using the model include government and credit securities in 25 currencies, MBS, ABS, and CMBS, inflation-linked securities, interest rate and credit derivatives, and equities. The risk factors for such a diverse and extended set of asset classes display very different behaviors; therefore, in this embodiment we chose the simulation approach to model the market. This approach is general and in principle can accommodate any distribution. However, it is important to impose structure on this distribution during the estimation process. Indeed, the amount of information contained in the final joint distribution of risk factors far exceeds the available information contained in the time series of the market risk factors; therefore, only by imposing structure can we derive meaningful estimates of the joint distribution of the market.

Step 2. "Pricing": From Risk Factors to the Distribution of a Security's Returns Ultimately, in order to generate portfolio returns, we need security prices at a given investment horizon. The randomness contained in the joint distribution of the risk factors must ultimately be translated into a joint distribution of security prices.

For instance, if a specific steepening scenario (short maturities down, long maturities up) in the above joint normal distribution for the Treasury key rate changes has a probability p of materializing, with the same probability p the value of a short-maturity bond will increase and at the same time the value of a long-maturity bond will decrease by amounts that can be calculated precisely from the size of the steepening and the bond characteristics.

Pricing can be exact, namely "full-repricing," or approximate, using the "Greeks." Typically the pricing function for a fixed-income security or for an exotic derivative is complex, making it difficult to carry forward the analytical method to produce the distribution of prices. Hence, full-repricing can only be performed when the simulation approach is chosen to model the risk factors. Since the computational cost of repricing a security in each scenario is high, full-repricing is only feasible when the number of scenarios is low, as in the historical simulation case, or when the number of securities is limited, i.e., in a very specific market.

On the other hand, a first-order "Greeks" (or "theta-delta-vega," or "carry-duration") pricing approximation can be used with both the analytical and simulation approaches. Unfortunately, in general, using the first-order approximation to produce the distribution of prices is not satisfactory.

A second-order "Greeks" (or "gamma" or "convexity") approximation is better for most securities (see below for more details). If one makes the extreme assumption that the risk factors are normally distributed, then the second-order approximation can be performed analytically. However, under very general assumptions for the risk factors, the second-order "Greeks" approximation can also be handled numerically with a large number of simulations. This is the approach we take in an embodiment using the Tail Risk Model.

Step 3. "Aggregation": from Single-Securities to the Portfolio's Distribution

Figure 19:
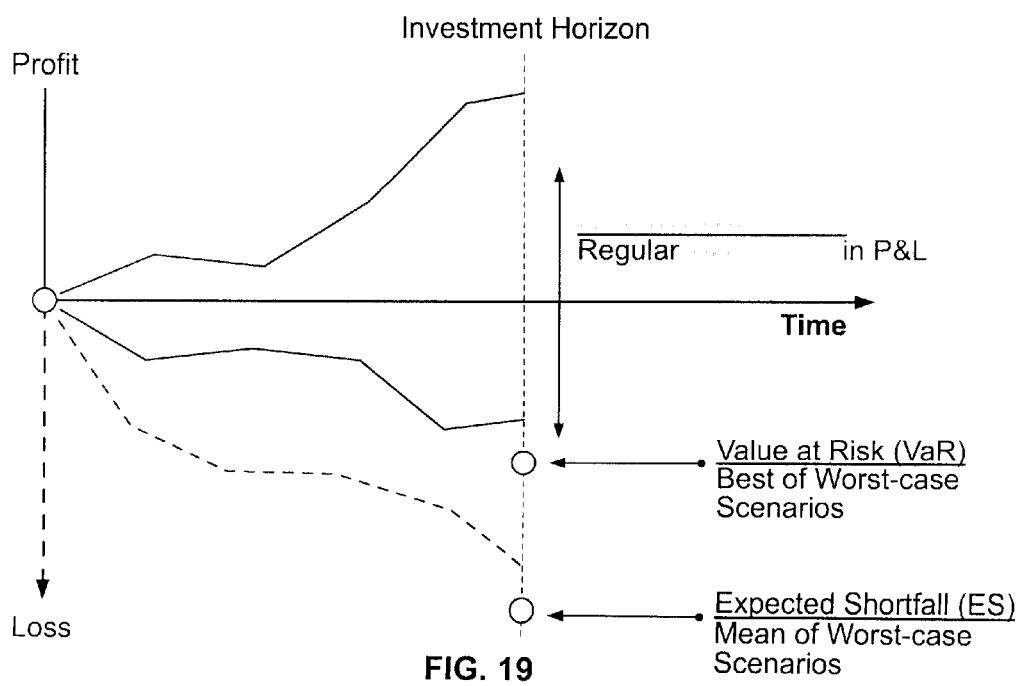
FIG. 19 illustrates summarizing the Return (P&L) Distribution-Standard Deviation, VaR and ES.

The joint distribution of all the individual security returns in a portfolio must be aggregated to produce the portfolio's distribution of returns or P&L (see FIG. 19).

For instance, a long-short position in the above long-maturity and short-maturity bonds gives rise to a specific P&L with probability p.

Again, the first- or second-order analytical approximation can be aggregated analytically, but the results only apply to extremely restrictive (e.g., normal) markets. On the other hand, the simulation-based approach can easily be aggregated scenario-by-scenario, which is the approach we take in an embodiment.

Step 4. Summarizing Information: Portfolio Volatility and Tail Risk

The wealth of information contained in the final distribution of a portfolio's returns or P&L is not easy to interpret. A few significant statistics can help summarize this information. The Tail Risk Model summarizes the returns or P&L distribution in terms of the standard deviation, the value at risk (VaR), and the expected shortfall (ES) (see FIG. 19).

The standard deviation is formally defined as the normalized expectation of the square deviations from the mean.[12] Denoting a portfolio's P&L by $\Pi$, the portfolio's P&L standard deviation is defined as:

[12] When measuring a portfoloio's returns net of its benchmark's return, the standard deviation is known as tracking error volatility.

$$Sd = \sqrt{E\{(\Pi - E\{\Pi\})^2\}} \quad (1)$$

Intuitively, the standard deviation is a measure of the potential variability of the P&L under normal market conditions.

In order to analyze the tails of a distribution, the Tail Risk Model also calculates the VaR and the ES. The VaR is defined as a percentile of the loss:

$$VaR_c = Q_{-\Pi}(c) \quad (2)$$

where $Q_X(c)$ denotes the c×100-percentile of the distribution of X, and the confidence c is typically set very high (e.g., c≈99%).

Intuitively, in a set of, say, 100,000 simulations, the 99%-confidence VaR, $VaR_{99\%}$, is the best among the worst 1,000 scenarios.

Since the VaR is insensitive to the distribution of the remaining 999 worst-case scenarios, in an embodiment we also provide the expected loss, or Expected Shortfall (ES), conditioned on the loss exceeding the VaR:

$$ES_c = E\{-\Pi | -\Pi \geq VaR_c\}. \quad (3)$$

Intuitively, in a set of 100,000 simulations, the 99%-confidence ES, $ES_{99\%}$, is the average P&L among the worst 1,000 P&L scenarios.

The standard deviation, the value at risk and the expected shortfall of the P&L, constitute the output of the Tail Risk Model in an embodiment.

6. Modeling the Distribution of Risk Factors

Total market risk is modelled as the combinations of three broad classes of risk factors: a set X of systematic factors which affect all the securities; a set $\epsilon$ of idiosyncratic factors which affect each security individually; and a set B of default factors which affect credit-risky bonds.

6.1 Systematic Risk Factors

The exhaustive and yet parsimonious set of K≈350 systematic factors, such as key rate changes, that span the large market covered by the Lehman Global Risk Model is detailed in Dynkin, Joneja, et al. (2005). Recently, several new factors have been added to better model credit risk and to cover new asset classes such as equities. Therefore, the set of systematic factors is now approximately K≈600.

In an embodiment, we model and estimate the joint distribution of the factors according to a marginal-copula factorization. We represent the marginal distribution of each factor by means of its cumulative distribution function ("cdf"):

$$F_k(x) \equiv \text{Prob}\{X_k \leq x\}. \ k=1,\ldots,K. \quad (4)$$

Periodically, we use the information available in the time series of each factor to estimate all the cumulative distribution functions.

The estimation process fits each factor to a Student t distribution with zero expected value, a factor-specific degrees of freedom and a factor-specific scatter parameter. A method comprised in an embodiment is as follows. First, we use the whole time series of a given factor to fit the degrees of freedom, which represent the tail behavior, or extreme events, of that factor. Next, we use an exponentially smoothed quasi-maximum-likelihood approach with a half-life of one year to fit the scatter parameter to the most recent observations.[13] However, as discussed below, the Student t assumption does not play any role in the subsequent steps of the model in this embodiment. Therefore, further refinements that account for skewness or other features can easily be included in the Tail Risk Model.

[13] See Purzitsky (2006) for more details.

For instance, estimates of the degrees of freedom $v_k$ and the scatter parameter $\sigma_k$ of the distribution of the monthly changes in the six-month and ten-year key rates of the Treasury curve as of April 2007 are:

$$X_{6m}: v_{6m} \approx 5, \sigma_{6m} \approx 18 \text{ bps} \quad (5)$$

$$X_{10y}: v_{10y} \approx 11, \sigma_{10y} \approx 24 \text{ bps} \quad (6)$$

In a t-distribution, the lower the degrees of freedom, the farther away the distribution is from normality. In particular, a distribution with 5 degrees of freedom is significantly "non-normal."

Similarly, the estimated parameters for the banking credit spread or the utilities credit spread risk factors are:

$$X_{ba}: v_{ba} \approx 4, \sigma_{cr} \approx 5 \text{ bps} \quad (7)$$

$$X_{ut}: v_{ut} \approx 4, \sigma_{ut} \approx 6 \text{ bps} \quad (8)$$

For these factors, the degrees of freedom are even lower and the occurrence of extreme events, or "fat tails," is much more likely than would be the case if they were normally distributed.

Since the marginal distributions are determined in (4), the full joint distribution of the systematic factors X is completely determined by the choice of a dependence structure, also known as a copula. In an embodiment, we model the dependence among the factors by means of a normal copula. More precisely, consider a normal vector with correlation matrix Γ, as estimated by the Global Risk Model:

$$Y \sim N(0, \Gamma). \quad (9)$$

We model the joint distribution of the systematic risk factors as follows:

$$\begin{pmatrix} X_1 \\ \vdots \\ X_K \end{pmatrix} \stackrel{d}{=} \begin{pmatrix} F_1^{-1}(\Phi(Y_1)) \\ \vdots \\ F_K^{-1}(\Phi(Y_K)) \end{pmatrix}, \quad (10)$$

where Φ denotes the cdf of the standard normal distribution. This joint structure is consistent with the marginal specification described above. Indeed, it turns out that the cdf of the generic k-th factor implied by (10) is precisely (4).

Consider the monthly change of the six-month rate $X_{6m}$. Although as in (5) this variable is not normal, we transform it into a standard normal random variable:

$$Y_{6m} = \Phi^{-1}(F_{6m}(X_{6m})) \sim N(0,1). \quad (11)$$

This non-linear transformation is similar in nature to the computation of the z-score, whereby a random variable is de-meaned and is divided by its standard deviation.[14] If we apply a similar transformation to the change of the ten-year rate $X_{10y}$, we obtain from (6) another standard normal distribution:

[14] See Meucci (2005).

$$Y_{10y} = \Phi^{-1}(F_{10y}(X_{10y})) \sim N(0,1). \quad (12)$$

We assume that the transformed variables $Y_{6m}$ and $Y_{10y}$ are jointly normal:

$$\begin{pmatrix} Y_{6m} \\ Y_{10y} \end{pmatrix} \sim N\left(\begin{pmatrix} 0 \\ 0 \end{pmatrix}, \begin{pmatrix} 1 & \rho \\ \rho & 1 \end{pmatrix}\right), \quad (13)$$

where the only free parameter ρ represents the correlation of the transformed variables.

We represent the joint distribution of the factors X in terms of a J×K panel X of J joint Monte Carlo simulations: the generic j-th row represents a joint scenario for the factors X and the generic k-th column represents the marginal distribution of the k-th factor $X_k$. Numerical tests show that the quality of the simulations is roughly independent of the number K of factors. On the other hand, the quality improves with the number of simulations, but so does the computational cost. We have chosen the number of simulations appropriately to achieve a balance between quality and computational cost.

Figure 20:
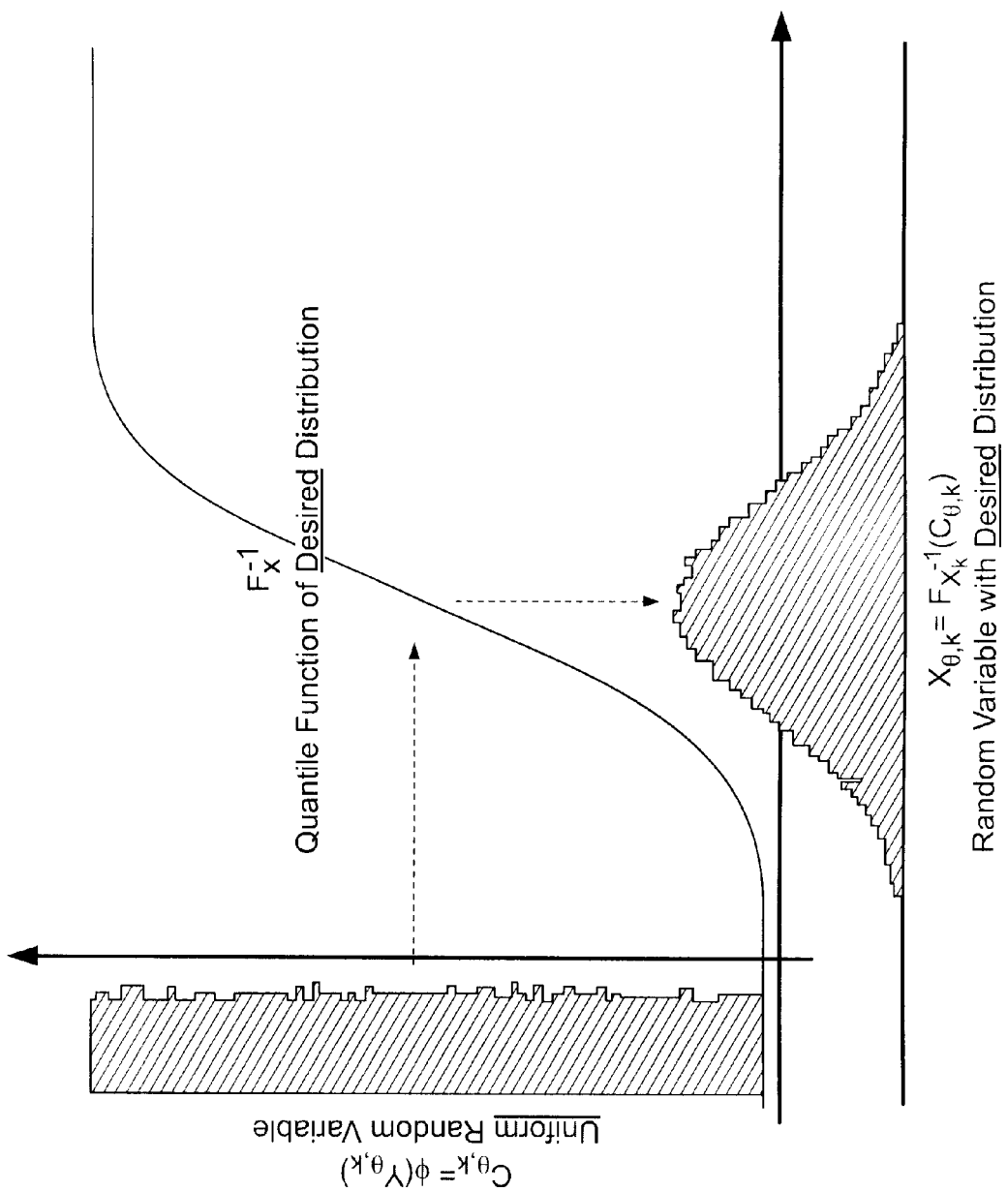
FIG. 20 shows a Uniform Distribution Transformed into a Desired Marginal Distribution with a Desired Joint Structure.

To produce X in practice we proceed as in FIG. 20. First we generate a J×K panel y of J joint Monte Carlo simulations from the normal distribution (9). Then we apply the standard normal cdf Φ to each entry of the panel y, thereby obtaining a J×K panel c≡Φ(y). The columns of this panel have a uniform distribution and represent the copula. Finally, we apply the suitable quantile function $F_k^{-1}$ to each column of the copula panel c. The joint distribution of the systematic factors X is fully represented by the panel of Monte Carlo scenarios X.

We conclude this section with a remark on our choice of a normal copula (9) to model co-dependence. This structure is fully described by a correlation matrix. However, there is evidence that certain pairs of factors exhibit greater tail co-dependence than that implied by their correlation. This suggests introducing a richer model. For instance, in the same way as we currently use a Student t distribution to de-couple the "regular" risk from the "tail" risk of a factor, we could use a t-copula to de-couple "regular" co-dependence from "tail"

co-dependence. Indeed, the t-copula features higher co-dependence among extreme events than the normal copula.

However, a t-copula offers only a single parameter to express the excess tail co-dependence of all the variables; therefore, it is appropriate only for small sets of variables that display similar tail behavior such as the credit factors used to price CDOs. In certain embodiments using the Tail Risk Model, where the number of factors is large and the relationship between most factors weak, using a t-copula is not preferred (but not excluded).

6.2 Idiosyncratic Risk Factors

Idiosyncratic shocks are security-specific sources of risk that are in general independent of one another. However, there might be non-zero correlations among some securities, such as those securities belonging to the same issuer.[15] Therefore, there exist small clusters of non-zero idiosyncratic correlation in the market.

[15] In the credit market these correlations are modeled as a function of the spread of the securities involved; see Chang (2003) for the intuition and the details on this approach.

Consider the generic m-th cluster, e.g., the generic m-th issuer. In an embodiment, the joint distribution of the idiosyncratic shock $\epsilon_m$ for the m-th cluster is modeled by means of a multivariate t distribution:

$$\epsilon_m \sim St(v_m, 0, \Psi_m), m=1, \ldots, M. \quad (14)$$

In this expression, $\epsilon_m$ is a vector with a cluster-specific number of entries $N_m$, one for each security in the cluster; M is the total number of clusters; $v_m$ are the cluster-specific degrees of freedom (d.o.f.); 0 is the expected value; and $\Psi_m$ is the cluster-specific scatter matrix.

The d.o.f. $v_m$ in (14) preferably are estimated as follows: first, partition the market into mutually exclusive macro subsectors that include several clusters. Then, for each bucket estimate the d.o.f. of the idiosyncratic shock of each security by maximum likelihood. Next, for each bucket consider the cross-sectional distribution of these estimates, and finally estimate the d.o.f. for all the clusters in the bucket as the median of this distribution.

TABLE 15 below depicts the degrees of freedom for a few macro-buckets.

| Bucket | d.o.f | (15) |
|---|---|---|
| Treasuries | 10 | |
| Investment grade | 8 | |
| High-yield distressed | 4 | |

As for the estimation of the scatter matrix $\Psi_m$ in (14), we first refer to the covariance, which is estimated as in the Global Risk Model. Then, the covariance and the degrees of freedom unequivocally determine the $N_m \times N_m$ scatter matrices $\Psi_m$ through the relationship $Cov\{\epsilon\} = \Psi_m v_m/(v_m - 2)$.

For instance, Cisco currently has three different bonds outstanding, namely 17275RAA, 17275RAB, 17275RAC. Therefore Cisco corresponds to a three-dimensional cluster $\epsilon'_{CIS} \equiv (\epsilon_{CIS}^{(*A)}, \epsilon_{CIS}^{(*B)}, \epsilon_{CIS}^{(*C)})'$, where $$\epsilon_{CIS} \sim St(V_{CIS}, 0, \Psi_{CIS}), \quad (16)$$

The degrees of freedom are estimated $v_{CIS} \approx 8$. The covariance matrix is estimated as $$Cov\{\epsilon_{CIS}\} \approx \begin{pmatrix} 95 & 88 & 226 \\ \vdots & 402 & 465 \\ \vdots & \vdots & 2640 \end{pmatrix} \quad (17)$$

where the units are squared basis points per month. Therefore the scatter matrix reads:

$$\Psi_{CIS} = \frac{v_{CIS} - 2}{v_{CIS}} Cov\{\epsilon_{CIS}\} \approx \begin{pmatrix} 72 & 66 & 170 \\ \vdots & 301 & 349 \\ \vdots & \vdots & 1980 \end{pmatrix} \quad (18)$$

The different idiosyncratic variance of these three bonds is due to their different maturities of two, four, and nine years, respectively. The joint distribution of the idiosyncratic factors is fully represented by the set of parameters (14).

6.3. Default Risk Factors

Securities such as high yield bonds are exposed to default risk. For the generic n-th security, the event of default is a Bernoulli variable, i.e., a variable $B_n$ which can only assume the values 1 or 0 with probabilities $p_n$ and $1-p_n$, respectively:[16]

[16] See Change (2003).

$$B_n \begin{cases} 1. & \text{if } n\text{-}th \text{ security defaults} \\ 0. & \text{if } n\text{-}th \text{ security does not defaults} \end{cases} \quad (19)$$

These Bernoulli variables are not independent across securities. For instance, issuers in the same industry are more likely to default together. Also, bonds issued by the same issuer (or, obligor) are assumed to default together. The dependence structure among the defaults (see FIG. 21) preferably is modeled according to a multivariate generalization of the structural approach by Merton (1974).

First, the default of a company occurs when its value falls below a given threshold. Equivalently, letting a firm's equity proxy its value, the company defaults when its equity return falls below a given threshold. The threshold must be set in a way consistent with (19): the probability of the n-th return being lower than the threshold must equal exactly $p_n$. Letting $Z_n$ denote the de-meaned and normalized equity return of the n-th company; $F_n(z) \equiv P\{\bar{Z}_n < z\}$ its cdf; and $\lambda_n$ the threshold which satisfies $F_n(\lambda_n) \equiv p_n$, we obtain:

$$B_n \begin{cases} 1. & \bar{Z}_n < \lambda_n \\ 0. & \bar{Z}_n \geq \lambda_n \end{cases} \quad (20)$$

At this stage, the dependence among the default events is driven by the dependence among the standardized equity returns $\bar{Z}$. Therefore the true market default risk factors are $\bar{Z}$. We model these factors as a normal distribution which is fully specified by a correlation matrix:

$$\bar{Z} \sim N) 0. C). \quad (21)$$

Figure 21:
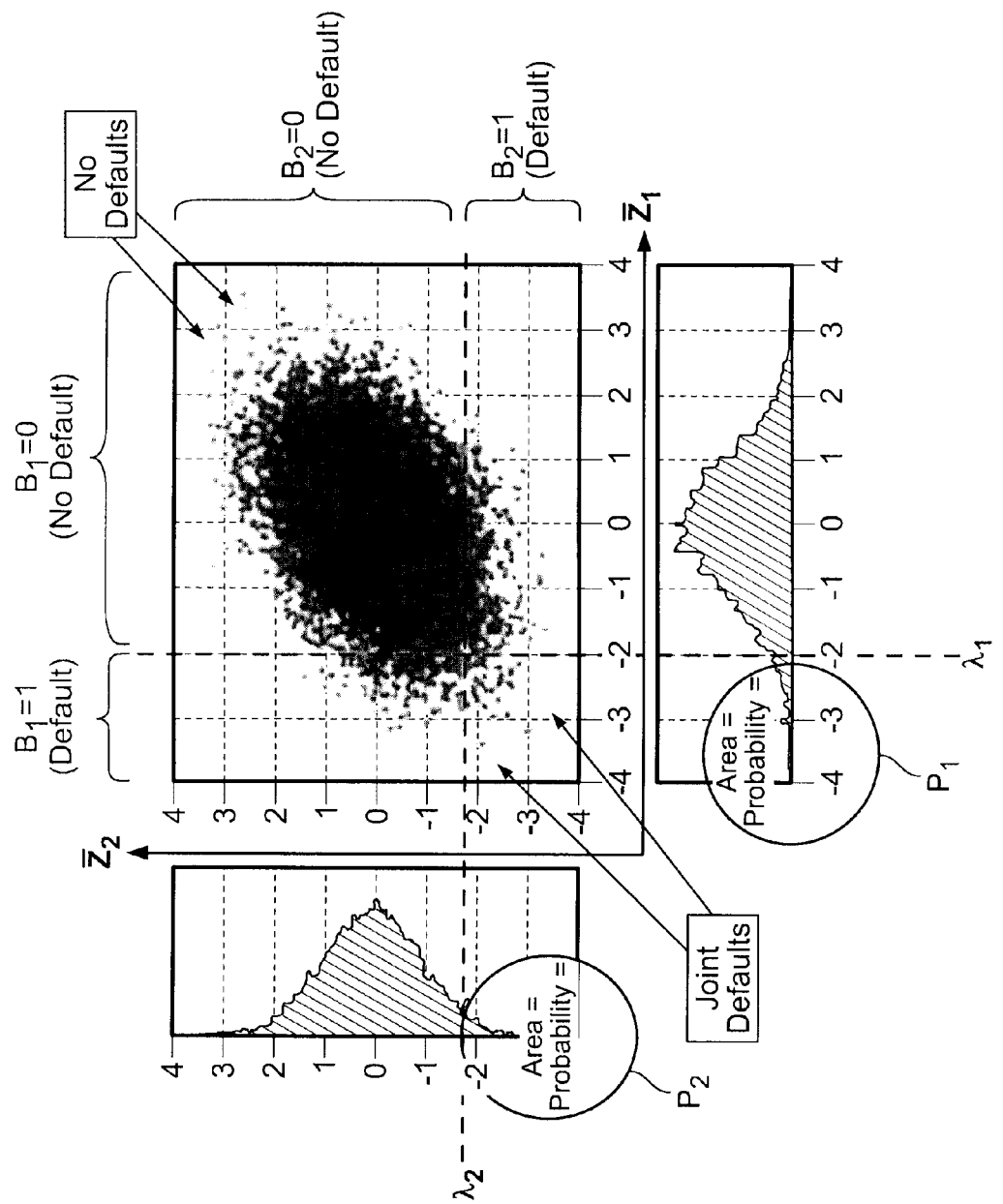
FIG. 21 depicts Credit Default Scenarios Triggered by Issuer's Low Asset Value.

In FIG. 21 we consider the case of two issuers whose normalized stock returns $Z_1$ and $Z_2$ display a correlation of 70%. The joint normal scenarios of $\overline{Z}_1$ and $\overline{Z}_2$ are shown in the upper-right portion of the scatter-plot figure. The projection of the scatter-plot on the axes gives rise to the marginal distributions $\overline{Z}_1$ and $\overline{Z}_2$, as represented by the respective standard-normal histograms. The area in the lower tail of the first marginal cdf below the threshold is the normalized number of scenarios such that $Z_1 < \lambda_1$. Therefore $$P\{Z_1 < \lambda_1\} = F_1(\lambda_1) = p_1. \tag{22}$$

A similar argument holds for $\overline{Z}_2$.

The joint distribution of the default triggers Z is fully represented by the parametric form (21). In order to make this distribution compatible with the simulation-based representation X of the systematic component, we represent the joint distribution of the default triggers Z in terms of a J×N panel of Monte Carlo scenarios $\overline{\mathcal{Z}}$. As for the systematic panel X, the generic j-th row represents a joint scenario for the factors Z and the generic n-th column represents the marginal distribution for the default trigger of the n-th issuer $\overline{Z}_n$, which is standard normal.

7. Pricing: The Securities' Distribution

The P&L (return) of the generic n-th security $\Pi_n$ is approximated in an embodiment as the sum of a systematic term $S_n$, which is completely determined by the scenarios of the systematic factors; a security-specific term $\epsilon_n$, namely the idiosyncratic shock; and a negative term $LGD_n$, the loss given default, in case the n-th security defaults. Using the Bernoulli variables (19) this means:

$$\Pi_n \approx S_n + B_n LGD_n - t_n. \tag{23}$$

Assuming that the loss given default is deterministic,[17] pricing becomes a matter of expressing $S_n$ and $B_n$ in terms of the systematic factors X in (10) and the default factors Z in (21).

[17] This assumption can be relaxed.

7.1. Systematic Factors

For small realizations of the systematic factors X in the Global Risk Model, the systematic P&L is approximated in an embodiment by a second-order (gamma or convexity) expansion:

$$S_n \approx \theta_n + L'_n X + X' Q_n X. \tag{24}$$

In this expression $\theta_n$ is the deterministic component, known as the "theta" in the derivatives world or as the "carry" in fixed income; $L_n$ is a K-dimensional vector of linear exposures, the "deltas-vegas" or the "durations," which account for the linear effects of the systematic factors on the market; and $Q_n$ is a K×K matrix that accounts for the quadratic, non-linear effects of the systematic factors on the market, some of which are known as the "gammas" or "convexities."

For instance, assume that the generic n-th security is a Treasury bond. Then the linear exposures $L_n$ have non-zero entries corresponding to the key-rates, such as (5) or (6). We call these exposures the key-rate durations. Regarding the matrix $Q_n$ of the quadratic exposures, assume that the only non-zero entries lie on the diagonal corresponding to the key-rates; furthermore, assume that these entries are all equal. This is equivalent to replacing the quadratic term in (24) with one single additional factor:

$$S_n \approx L_n^{6m} X_{6m} + L_n^{2y} X_{2y} + L_n^{5y} X_{5y} + L_n^{10y} X_{10y} + L_n^{20y} X_{20y} + L_n^{30y} X_{30y} + Q_n X_{C_v}^2. \tag{25}$$

In this expression, the single exposure $Q_n$ is called convexity and the additional factor is fully determined by the key-rates:

$$X_{C_v}^2 \equiv \frac{1}{6}(X_{6m}^2 + X_{2y}^2 + X_{5y}^2 + X_{10y}^2 + X_{20y}^2 + X_{30y}^2). \tag{26}$$

For each security, simple matrix manipulations of the panel X of systematic simulations that reflect (24) yield the distribution of the systematic P&L in terms of a large number J of Monte Carlo scenarios.

The quality of the quadratic approximation (24) depends on the relationship between the scale of the factors and the curvature of the pricing function. For some securities, the combination scale-curvature makes the approximation (24) invalid. For these securities we implement a grid interpolation of the full repricing function.

Figure 22A:
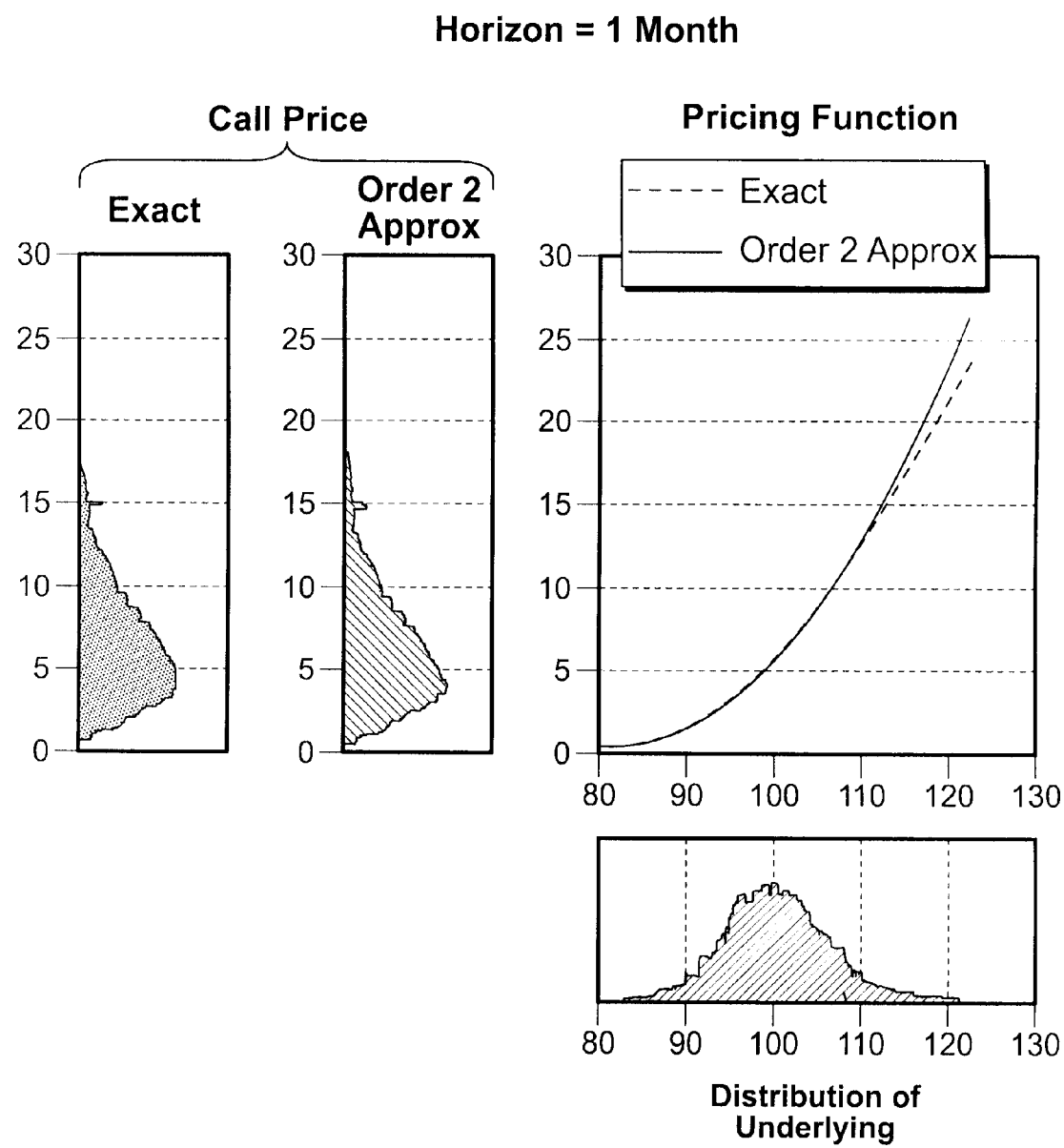
FIG. 22 depicts a Quadratic Approximation with Different Horizons.
Figure 22B:
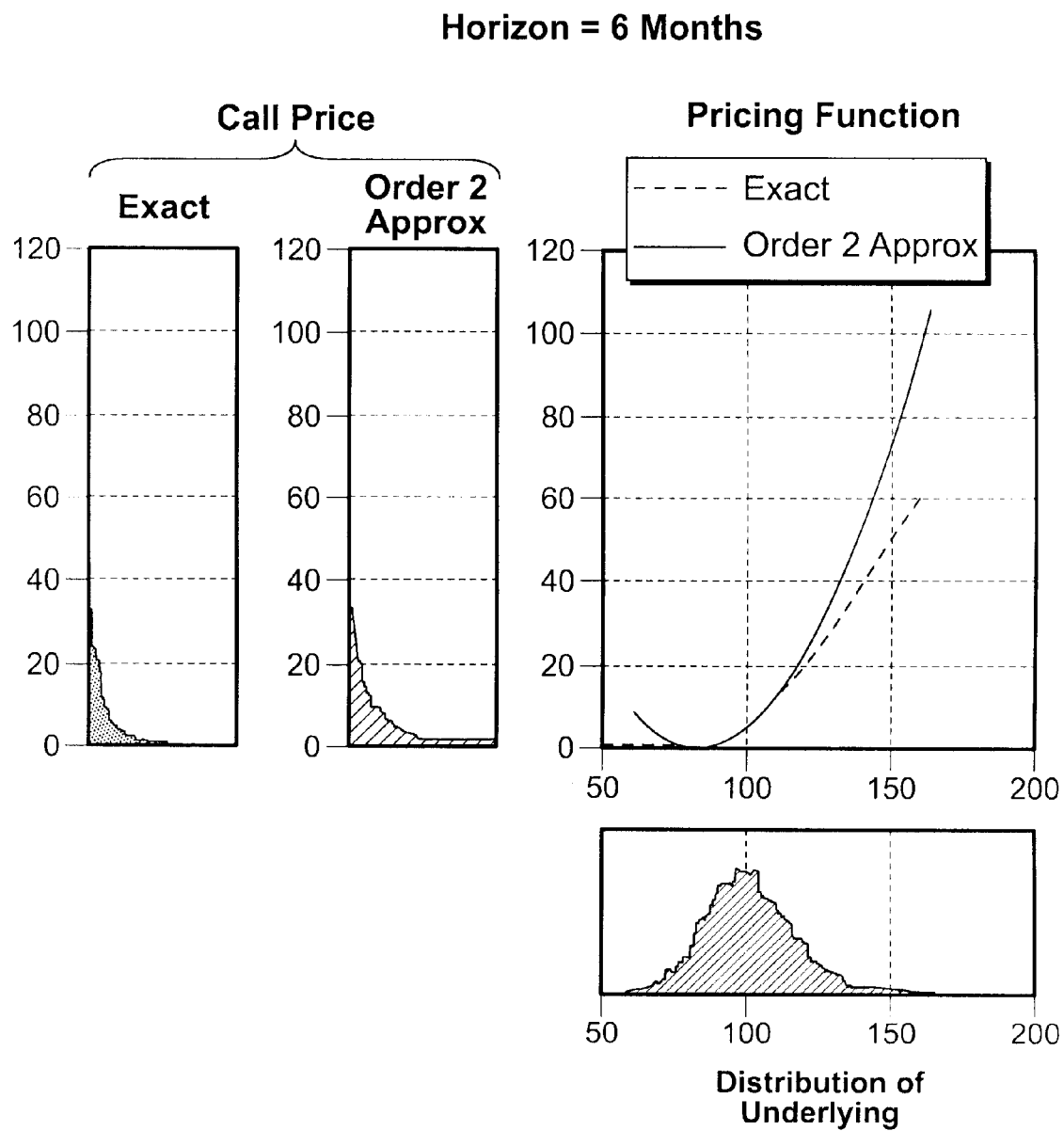

For instance, consider the plain-vanilla Black-Scholes call option pricing function:

$$C = C_{BS}(S, K, T, \sigma, r_f). \tag{27}$$

where S is the value of the underlying at the investment horizon, K is the strike price, $\tau$ is the time to maturity at the investment horizon, $\sigma$ is the implied volatility and $r_f$ is the risk-free rate. Assume as in Black and Scholes (1973) that the compounded returns are normal:

$$\ln\left(\frac{S_T}{s_0}\right) \sim N(T\mu, T\sigma^2). \tag{28}$$

where $\mu \approx 0$ and $\sigma \approx 20\%$ and time is measured in years. Then the second-order quadratic approximation is appropriate for horizons of the order of one month (see the left portion of FIG. 22). However, as we see in the right portion of FIG. 22, the same pricing function (27) is not appropriate for horizons of six months, due to the "square-root" propagation of risk (28) as the horizon T increases.

7.2. Idiosyncratic Factors

The idiosyncratic term (14) already operates directly at the security level (23); therefore, the pricing step is unnecessary in this case. In principle, it is immediate to generate a large number J of Monte Carlo simulations from this distribution for each security. However, as for the systematic component, from a computational point of view this step would be tremendously costly. Fortunately, we can bypass this step and simulate directly the portfolio-aggregate idiosyncratic component of the P&L (see Section 8.2 below).

7.3. Default Factors

Finally, regarding the default contribution, $B_n LGD_n$, in (23), we again refer to FIG. 21. The joint normal assumption (21) on the default triggers Z implies that the cdf $F_n$ of the generic trigger $\overline{Z}_n$ is actually $\Phi$, the cdf of the standard normal distribution. Recalling that the threshold $\lambda_n$ satisfies $F_n(\lambda_n) \equiv p_n$, we can write (20) as:

$$B_n \begin{matrix} \overset{p_n}{\nearrow} & 1. & \Phi(\overline{Z}_n) < p_n \\ \underset{1-p_n}{\searrow} & 0. & \Phi(\overline{Z}_n) \geq p_n \end{matrix} \tag{29}$$

Therefore, we define the joint distribution of the default events B as follows:

$$\begin{pmatrix} B_1 \\ \vdots \\ B_N \end{pmatrix} \stackrel{d}{=} \begin{pmatrix} Q_{B_1}(\Phi(\bar{Z}_1)) \\ \vdots \\ Q_{B_N}(\Phi(\bar{Z}_N)) \end{pmatrix}. \qquad (30)$$

where $Q_{B_n}$ is the inverse cdf of the n-th Bernoulli variable: $Q_{B_n}(u)=1$ if $n \leq p_u$ and otherwise $Q_{B_n}(u)=0$.

For instance, the distribution of the first default trigger in FIG. 21 is:

$$\begin{array}{c|c} B_1 \equiv 1 & B_1 \equiv 0 \\ \hline p_1 \equiv 2.25\% & 1 - p_1 \equiv 97.75\% \end{array} \qquad (31)$$

The distribution of the second default trigger is:

$$\begin{array}{c|c} B_2 \equiv 1 & B_2 \equiv 0 \\ \hline p_2 \equiv 3.55\% & 1 - p_2 \equiv 96.45\% \end{array} \qquad (32)$$

Their joint distribution reads:

$$\begin{array}{c|cc} & B_1 \equiv 1 & B_1 \equiv 0 \\ \hline B_2 \equiv 1 & 0.42\% & 3.13\% \\ B_2 \equiv 0 & 1.83\% & 94.62\% \end{array} \qquad (33)$$

The two default triggers, $B_1$ and $B_2$, are not independent. Indeed, the joint probability of default (i.e., the probability of both $B_1$ being one and $B_2$ being one) is 0.42%, which is not equal to the product of the probability of $B_1$ being one and the probability of $B_2$ being one, which is $p_1 p_2 < 0.01\%$.

Given the stochastic representation (30) of the default events B, one can generate joint Monte Carlo default simulations by applying the standard normal cdf and the appropriate Bernoulli quantile functions to the panel $\bar{Z}$. of default trigger simulations obtained in Section 6.3. The result is a J×N panel of Monte Carlo scenarios B. The generic j-th row represents a joint scenario for the default events in the market and the generic n-th column represents the marginal distribution of default for the n-th issuer.

8. Aggregation: The Portfolio Distribution

The joint distribution of the securities' P&L, as provided by the pricing step, preferably is aggregated at the portfolio level, scenario by scenario, thus producing a full Monte Carlo simulation of the portfolio's P&L. Indeed, the portfolio P&L is a linear combination of the securities' P&L:

$$\Pi \equiv \sum_{n=1}^{N} w_n \Pi_n, \qquad (34)$$

where $\omega_n$ represents the amount of the n-th security.[18] From (23), one can write the portfolio P&L as the sum of three terms: systematic, idiosyncratic, and default P&Ls:

[18] The present discussion applies to both total return portfolios and benchmark-relative allocations. In the latter case, w is to be interpreted as the difference between the portfolio weights and the benchmark weights.

$$\Pi = \Pi^S + \Pi^I + \Pi^D. \qquad (35)$$

8.1 Systematic P&L

From (23), (24) and (34), the systematic P&L is defined as:

$$\Pi^S = \theta_\Pi + L'_\Pi X + X' Q_\Pi X. \qquad (36)$$

where the portfolio-specific scalar $\theta\Pi$, vector $L_\Pi$, and matrix $Q_\Pi$ read respectively:

$$\theta_\Pi \equiv \sum_{n=1}^{N} w_n \theta_n, \qquad (37)$$

$$L_\Pi \equiv \sum_{n=1}^{N} w_n L_n,$$

$$Q_\Pi \equiv \sum_{n=1}^{N} w_n Q_n.$$

Simple matrix manipulations according to (36) of the panel X of simulations for the systematic factors obtained in Section 6.1 yield the distribution of $\Pi^S$ in terms of the J Monte Carlo scenarios in the panel.

8.2 Idiosyncratic

From (23) and (34), the idiosyncratic P&L in (35) is defined as:

$$\Pi^I \equiv \sum_{m=1}^{M} \eta_m. \qquad (38)$$

where $\eta_m \equiv \omega_n \epsilon_n$ is the idiosyncratic P&L of the sub-portfolio relative to the generic m-th correlation cluster. From (14) the cluster-level shock is t-distributed:

$$\eta_m \sim St(\nu_m, 0, w'_m \Psi_m w_m). \; m=1, \ldots, M. \qquad (39)$$

where the vector $w_m$ represents the weights of the sub-portfolio relative to the m-th correlation cluster. Therefore the idiosyncratic P&L (38) is the sum of independent t-distributed random variables. When the portfolio contains only one cluster, $\Pi^I$ is t-distributed, and when the number of clusters in the portfolio is very large, diversification makes $\Pi^I$ normal. In intermediate cases, the distribution of $\Pi^I$ is computed semi-analytically and a large number J of Monte Carlo scenarios are generated.[19]

[19] For more details on the entropy-based methodology applied in this context, see Meucci For instance, consider the Cisco cluster described in (16). Assume that the portfolio consists of an equally weighed combination of these three C bonds. Then from (18) the idiosyncratic term η of the Cisco cluster has a t distribution with 8 degrees of freedom and scatter parameter 390 bp² per month. If bonds from a different issuer were present in the portfolio, they would give rise to an independent cluster and thus an independent t distribution. Suppose that the d.o.f. of this second distribution were also 8. Then the total portfolio would have a/distribution with a higher d.o.f., say 12. In other words, the total portfolio would be more "normal" than the two independent clusters.

8.3 Default P&L.

As for the default P&L $\Pi^D$ in (35), from (23) this term is defined as:

$$\Pi^D \equiv \sum_{n=1}^{N} w_n LGD_n B_n. \tag{40}$$

Assuming the loss given default $LGD_n$ is deterministic, simple matrix manipulations of the panel B of J joint default Monte Carlo simulations obtained in Section 6.3 yield the distribution of $\Pi^D$ in terms of a large number, J of Monte Carlo scenarios.

9. Analyzing Information: Contributions to Risk

With J Monte Carlo simulations for the systematic component of the portfolio P&L (36), J Monte Carlo simulations for the idiosyncratic component of the portfolio P&L (38), and J Monte Carlo simulations for the default component of the portfolio P&L (40), it is immediate to obtain J Monte Carlo simulations of the whole portfolio P&L distribution as in (35).

As discussed above, in an embodiment the Tail Risk Model summarizes the P&L distribution by volatility, value at risk, and expected shortfall. In order to help portfolio managers actively manage the distribution of their P&L, the Model also decomposes volatility, VaR, and ES into the contributions from the various risk factors.

To perform this decomposition, note that the P&L can be written in general as the product of a vector $\tilde{F}$ of S risk sources times the corresponding manager's active risk exposures $\tilde{b}$:

$$\Pi = \sum_{s=1}^{S} \tilde{b}_s \tilde{F}_s, \tag{41}$$

This formulation includes (34), where $S \equiv N$, the number of securities; $\tilde{F}_n \equiv \Pi_n$ represents the P&L of the securities; and $\tilde{b} \equiv w$ represents the respective portfolio weights. However, (41) also covers a factor-level decomposition. Indeed from (35)-(36) we obtain that $\tilde{b}$ contains the entries of $L_\Pi$ and $Q_\Pi$; $\tilde{F}$ represents the K systematic factors X, the few C linear combinations of their cross products that give rise to the convexity terms, the deterministic component, and the idiosyncratic and default components $\Pi^I$ and $\Pi^D$. The total number of factors is $S \equiv K+C+3$. In particular, it is easy to build a J×S panel of joint Monte Carlo simulations $\tilde{F}$ of the factors $\tilde{F}$ out of the systematic panel X and the idiosyncratic and default simulations, respectively.

We would like to express portfolio risk, as measured by volatility, VaR or ES, as the product of the risk factor exposures times the factor-specific "isolated" volatility, VaR or ES of the individual sources of risk, in a way fully symmetrical to (41). Unfortunately, such an identity does not hold. Consider the standard deviation (1):

$$Sd_\Pi = \sqrt{E\{(\Pi - E\{\Pi\})^2\}}. \tag{42}$$

It is well known that:

$$Sd_\Pi \neq \sum_{s=1}^{S} \tilde{b}_s Sd_s. \tag{43}$$

This fact is true in every market, even the simplest ones. Indeed, consider a normal market with only two factors:

$$\tilde{F} \sim X(\mu, \rho). \tag{44}$$

where $$\mu \equiv (0, 0)', \tag{45}$$

$$\sum \equiv \begin{pmatrix} \sigma_1^2 & \rho \sigma_1 \sigma_2 \\ \rho \sigma_1 \sigma_2 & \sigma_2^2 \end{pmatrix}.$$

Then $$\Pi \sim N(\mu_\Pi, \sigma_\Pi^2). \tag{46}$$

$\mu_\Pi \equiv 0_e \mu_- \{\Pi \equiv 0$ and $$\sigma_\Pi = \sqrt{\tilde{b}_1^2 \sigma_1^2 + \tilde{b}_2^2 \sigma_2^2 + 2\tilde{b}_1 \tilde{b}_2 \rho \sigma_1 \sigma_2}. \tag{47}$$

We immediately verify that, as in (43), unless $\rho = 1$ we obtain:

$$Sd_\Pi = \sigma_\Pi \neq \tilde{b}_1 \sigma_1 + \tilde{b}_2 \sigma_2 = \tilde{b}_1 Sd_1 + \tilde{b}_2 Sd_2. \tag{48}$$

The theory behind risk contributions rests on the observation that volatility, VaR, and ES are all homogeneous of degree one: By doubling the exposures $\tilde{b}$ in (41), we double the risk in the portfolio.[20]

[20] See Meucci (2005).

Although the decomposition (43) is not feasible, since the volatility is homogeneous the following identity holds true:

$$Sd_\Pi \equiv \sum_{s=1}^{S} \tilde{b}_s \frac{\partial Sd}{\partial \tilde{b}_s}. \tag{49}$$

where $$\frac{\partial Sd_\Pi}{\partial \tilde{b}} = \frac{\text{Cov}\{\tilde{F}\}\tilde{b}}{\sqrt{\tilde{b}' \text{Cov}\{\tilde{F}\}\tilde{b}}}. \tag{50}$$

Notice that (49) is an exact identity, not a first-order approximation. Total risk can still be expressed as the sum of the contributions from each factor, where the generic s-th contribution is the product of the "per-unit" marginal contribution $\partial Sd/\partial \tilde{b}$, times the "amount" of the s-th factor in the portfolio, as represented by the exposure $\tilde{b}_s$. Unfortunately, the per-unit marginal contribution $\partial Sd/\partial \tilde{b}$, is not a truly "isolated" factor-specific quantity, as it depends on the factor correlations within the entire portfolio. However, (49) does indeed provide an additive decomposition of risk.

For instance, applying (50) to our example (44)-(48) we obtain:

$$\frac{\partial Sd_\Pi}{\partial \tilde{b}_1} = \frac{\tilde{b}_1 \sigma_1^2 + \tilde{b}_2 \rho \sigma_1 \sigma_2}{\sqrt{\tilde{b}_1^2 \sigma_1^2 + \tilde{b}_2^2 \sigma_2^2 + 2\tilde{b}_1 \tilde{b}_2 \rho \sigma_1 \sigma_2}} \tag{51}$$

$$\frac{\partial Sd_\Pi}{\partial \tilde{b}_2} = \frac{\tilde{b}_2 \sigma_2^2 + \tilde{b}_1 \rho \sigma_1 \sigma_2}{\sqrt{\tilde{b}_1^2 \sigma_1^2 + \tilde{b}_2^2 \sigma_2^2 + 2\tilde{b}_1 \tilde{b}_2 \rho \sigma_1 \sigma_2}}. \quad (52)$$

Neither of these "per unit" marginal contributions is factor-specific. For instance, the contribution from the first factor depends on the volatility of the second factor $\sigma_2$, the correlation $\rho$ between the factors, and the portfolio weights and $\tilde{b}_2$. $\tilde{b}_1$ However, the weighted sum of (51) and (52) adds up to the total volatility (47).

From a computational point of view, the covariance of $\tilde{F}$ that appears in the partial derivatives (50) is provided by the sample covariance of the panel $\tilde{\mathcal{F}}$.

As for the standard deviation (43), the portfolio's VaR is not the weighted average of the isolated VaRs:

$$VaR_c \neq \sum_{s=1}^{S} \tilde{b}_s VaR_s. \quad (53)$$

However, since VaR is homogeneous we can therefore write it as the sum of the contributions from each factor:

$$VaR_c \equiv \sum_{s=1}^{S} \tilde{b}_s \frac{\partial VaR_c}{\partial \tilde{b}_s}. \quad (54)$$

Again, total risk can still be expressed as the sum of the contributions from each factor, where the generic s-th contribution is the product of the "per-unit" marginal contribution $\partial VaR_c / \partial \tilde{b}_S$ times the "amount" of the s-th factor in the portfolio, as represented by the exposure $\tilde{b}_S$.

In our normal example (44)-(48) the VaR is simply a multiple of the standard deviation. Therefore from (51) and (52) we obtain:

$$\frac{\partial VaR_c}{\partial \tilde{b}_1} = \kappa_c \frac{\tilde{b}_1 \sigma_1^2 + \tilde{b}_2 \rho \sigma_1 \sigma_2}{\sqrt{\tilde{b}_1^2 \sigma_1^2 + \tilde{b}_2^2 \sigma_2^2 + 2\tilde{b}_1 \tilde{b}_2 \rho \sigma_1 \sigma_2}} \quad (55)$$

$$\frac{\partial VaR_c}{\partial \tilde{b}_2} = \kappa_c \frac{\tilde{b}_2 \sigma_2^2 + \tilde{b}_1 \rho \sigma_1 \sigma_2}{\sqrt{\tilde{b}_1^2 \sigma_1^2 + \tilde{b}_2^2 \sigma_2^2 + 2\tilde{b}_1 \tilde{b}_2 \rho \sigma_1 \sigma_2}}. \quad (56)$$

where $R_c$ is the VaR with confidence c of a standard normal distribution.

In non-normal markets, the volatility does not fully determine the VaR. However, the partial derivatives that appear in (54) can be expressed conveniently as in Hallerbach (2003), Gourieroux, Laurent, and Scaillet (2000), Tasche (2002):

$$\frac{\partial VaR_c}{\partial b} \equiv -\mathbb{E}\{\tilde{F} \mid \Pi \equiv -VaR_c\}. \quad (57)$$

In turn, these expectations can be approximated numerically as in Mausser (2003), Epperlein and Smillie (2006):

$$\frac{\partial VaR_c}{\partial b} \approx -k_c' S_b. \quad (58)$$

In this expression $S_b$ is a J×S matrix, whose generic j-th column is the j-th column of the matrix $\tilde{\mathcal{F}}$ sorted as the order statistics of the J-dimensional vector $\tilde{\mathcal{F}}$ b; and $k_c$ is a Gaussian smoothing kernel peaked around the rescaled confidence level cJ. This is how the numbers in the exemplary Tail Risk Model reports described above preferably are obtained.

Finally, the ES is also homogeneous and thus we also can write the ES as the sum of the contributions from each factor:

$$ES_c \equiv \sum_{s=1}^{S} \tilde{b}_s \frac{\partial ES_c}{\partial \tilde{b}_s}. \quad (59)$$

In our normal example (44)-(48) the expected shortfall, like the VaR, is a multiple of the standard deviation. Therefore from (51) and (52) we obtain:

$$\frac{\partial ES_c}{\partial \tilde{b}_1} = \xi_c \frac{\tilde{b}_1 \sigma_1^2 + \tilde{b}_2 \rho \sigma_1 \sigma_2}{\sqrt{\tilde{b}_1^2 \sigma_1^2 + \tilde{b}_2^2 \sigma_2^2 + 2\tilde{b}_1 \tilde{b}_2 \rho \sigma_1 \sigma_2}} \quad (60)$$

$$\frac{\partial ES_c}{\partial \tilde{b}_2} = \xi_c \frac{\tilde{b}_2 \sigma_2^2 + \tilde{b}_1 \rho \sigma_1 \sigma_2}{\sqrt{\tilde{b}_1^2 \sigma_1^2 + \tilde{b}_2^2 \sigma_2^2 + 2\tilde{b}_1 \tilde{b}_2 \rho \sigma_1 \sigma_2}} \quad (61)$$

where $\xi_c$ is the expected shortfall with confidence c of a standard normal distribution.

In non-normal markets the volatility does not fully determine the expected shortfall. However, the partial derivatives that appear in (59) can be expressed as:

$$\frac{\partial ES_c}{\partial b} \equiv -\mathbb{E}\{F \mid \Pi \leq -Q_{-b'F}(c)\}. \quad (62)$$

In turn, we can numerically approximate these expectations as:

$$\frac{\partial R(b)}{\partial b} \approx -q_c' S_b. \quad (63)$$

where $q_c$ is a step function that jumps from 0 to 1/cJ at the rescaled confidence level cJ of the ES. This is how the numbers in the exemplary Tail Risk Model reports described above preferably are obtained.

Figure 23:
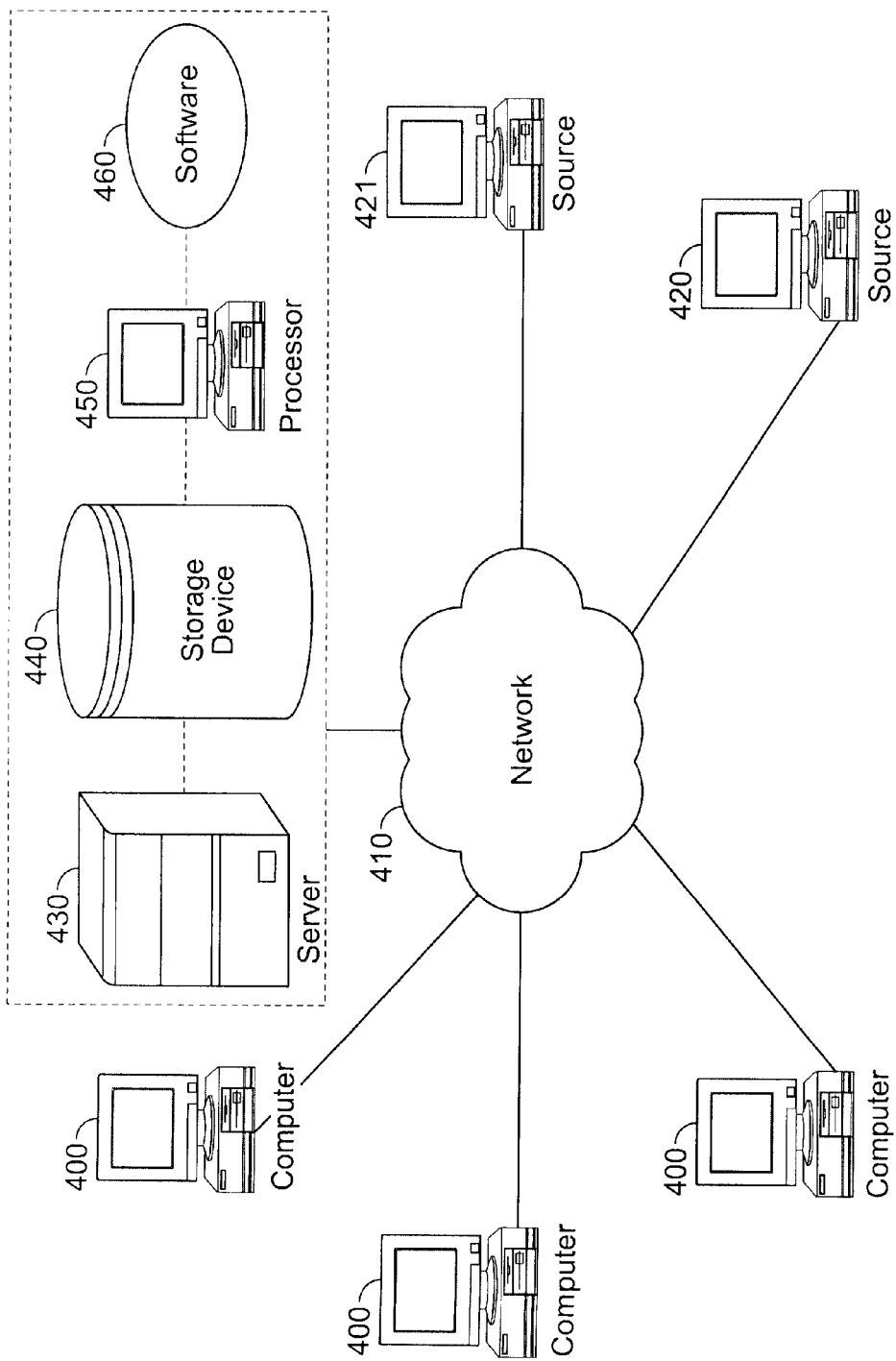
FIG. 23 depicts a computer based system for processing data according to an embodiment of the invention.

Embodiments of the present invention comprise computer components and computer-implemented steps that will be apparent to those skilled in the art. For example, calculations and communications can be performed electronically, and agreements can be composed, transmitted and executed electronically. An exemplary system is depicted in FIG. 23. As shown, computers 400 communicate via network 410 with a central server 430. A plurality of sources of data 420-421 relating to, for example, current and historical prices of securities and/or derivatives, also communicate via network 410 with a central server 430, processor 450, and/or other component to calculate and transmit, for example, VaR and ES.

The server 430 is coupled to one or more storage devices 440, one or more processors 450, and software 460.

Other components and combinations of components may also be used to support processing data or other calculations described herein as will be evident to one of skill in the art. Server 430 may facilitate communication of data from a storage device 440 to and from processor 450, and communications to computers 400. Processor 450 may optionally include local or networked storage (not shown) which may be used to store temporary information. Software 460 can be installed locally at a computer 400, processor 450 and/or centrally supported for facilitating calculations and applications.

For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Moreover, where a computer system is described or claimed as having a processor for performing a particular function, it will be understood by those skilled in the art that such usage should not be interpreted to exclude systems where a single processor, for example, performs some or all of the tasks delegated to the various processors. That is, any combination of, or all of, the processors specified in the claims could be the same processor. All such combinations are within the scope of the invention.

In summary, one or more embodiments of the tail risk methodology described herein (especially in the context of the Global Risk Model) preferably has one or more of the following distinguishing features (although none of these features is essential to the invention):

1. Measures systematic tail risk parametrically in the context of the very rich factorization of the tail risk model. In particular at least one embodiment of the tail risk model uses more than 700 systematic factors in order to be able to capture the risk of different portfolios specializing in different slices of the markets. All known tail risk methodologies that use very rich factorizations rely on empirical distributions because it is very difficult to estimate the parameters of the joint distribution of such a large number of factors. Since tail risk is being driven by definition by infrequent extreme events, such a method can misrepresent tail risk in the absence of extreme events in the recent history. A parametric distribution imposes additional structure in the estimation of tail risk that makes it more robust.

2. Specifically accounts for the effect of idiosyncratic factors (including the possibility of defaults) to tail risk exposure, and uses a novel algorithm to measure the effect of diversification to tail risk.

3. Uses one or more of the above-described mathematical formulas to decompose tail risk measures (VaR and ES; expected shortfall) into additive contributions of sub-portfolios (strategies), and/or exposure to particular risk factors.

The present invention has been described by way of example only, and the invention is not limited by the specific embodiments described herein. As will be recognized by those skilled in the art, improvements and modifications may be made to the invention and the illustrative embodiments described herein without departing from the scope or spirit of the invention.

References

Artzner, P., Delbaen, F., Eber, J. M., and Heath D., Coherent Measures of Risk, *Mathematical Finance*, 9(3): 203-228, 1999.

Chang, G., 2003, The new Lehman Brothers High Yield Risk model, *Lehman Brothers Publications*.

Dynkin, L., A. Desclee, A. Gould, J. Hyman, D. Joneja, R. Kazarian, V. Naik, M. Naldi, B. Phelps, J. Rosten, A. Silva, and G. Wang, 2005, The Lehman Brothers Global Risk Model: A Portfolio Manager's Guide, *Lehman Brothers Publications*.

Epperlein, E., and A. Smillie, 2006, Cracking VaR with kernels, *Risk Magazine* 19, 70-74.

Gourieroux, C., J. P. Laurent, and O. Scaillet, 2000, Sensitivity analysis of values at risk, *Journal of Empirical Finance* 7, 225-245.

Hallerbach, W., 2003, Decomposing portfolio value-at-risk: A general analysis, *Journal of Risk* 5, 1-18.

Mausser, H., 2003, Calculating quantile-based risk analytics with L-estimators, *Journal of Risk Finance* pp. 61-74.

Merton, R. C., 1974, On the pricing of corporate debt: The risk structure of interest rates, *Journal of Finance* 29, 449-470.

Meucci, A., 2005, *Risk and Asset Allocation* (Springer).

Meucci, A., 2007, Idiosyncratic portfolio risk in non-normal markets, *Lehman Brothers Publications*.

Purzitsky, A., 2006, Tail behavior of systematic risk factors in the Lehman Brothers global risk model, *Lehman Brothers Publications*.

Tasche, D., 2002, Expected shortfall and beyond, *Journal of Banking and Finance* 26, 1519-1533.

European Union, 27 Apr. 2004, *Commission Recommendation On the Use of Financial Derivative Instruments for Undertakings for Collective Investment in Transferable Securities (UCITS)*. Official Journal of the European Union.

European Union, 5 Apr. 2005, *CSSF circular* 05/176.

Elvinger, Hoss & Prussen, 2003, *Law of 20 Dec. 2002 on Undertakings for Collective Investments*.

What is claimed is:

1. A non-transitory computer readable storage medium having computer-executable instructions recorded thereon that, when executed on a computer, configure the computer to perform a method comprising:
    receiving data describing one or more risk factors associated with volatility of each of a first plurality of securities in a first portfolio;
    for each of said first plurality of securities:
        categorizing each of the one or more risk factors as a random variable and determining a fat-tailed t-distribution that best fits data regarding historical behavior of each of the one or more risk factors; and
        generating a first return distribution based on said best fit fat-tailed t-distribution; and
    aggregating the first return distribution for each of said first plurality of securities to generate an aggregated security return distribution for said first portfolio;
    wherein generating said first return distribution for each of the first plurality of securities, comprises:
        (a) sampling a value from each of the one or more risk factor's best fit fat-tailed t-distribution;
        (b) conducting a simulation based on a scenario defined by said sampled values;
        (c) incorporating data regarding a correlation among each of the one or more risk factors;
        (d) multiplying the sampled value from each of the one or more risk factor's best fit fat-tailed distribution by a risk factor exposure corresponding to each of the one or more risk factors to obtain a risk factor product for each of the one or more risk factors; and
(e) summing the risk factor product for each of the one or more risk factors to generate the return distribution.

2. The non-transitory computer readable storage medium of claim 1, further comprising performing steps (a)-(e) for each of a second plurality of securities in a second portfolio to generate a second return distribution for said second portfolio.

3. The non-transitory computer readable storage medium of claim 1, further comprising generating a tracking error distribution for said first portfolio by calculating a difference between the first return distribution for said first portfolio and the second return distribution for said second portfolio, and aggregating said first return distribution and said second return distribution.

4. The non-transitory computer readable storage medium of claim 3, further comprising calculating value at risk for said first portfolio based on said first return distribution for said first portfolio and said tracking error distribution.

5. The non-transitory computer readable storage medium of claim 3, further comprising calculating expected shortfall for said first portfolio based on said first return distribution for said first portfolio and said tracking error distribution.

6. The non-transitory computer readable storage medium of claim 3, further comprising calculating volatility for said first portfolio based on said first return distribution for said first portfolio and said tracking error distribution.

7. A system comprising:
memory operable to store at least one program;
at least one processor communicatively coupled to the memory, in which the at least one program, when executed by the at least one processor, causes the at least one processor to:
access and process data describing one or more risk factors associated with volatility of each of a first plurality of securities in a first portfolio;
for each of said first plurality of securities:
    categorize each of the one or more risk factors as a random variable and determine a fat-tailed t-distribution that best fits data regarding historical behavior of each of the one or more risk factors; and
    generate a first return distribution, based on said best fit fat-tailed t-distribution; and
aggregate the first return distribution for each of said first plurality of securities to generate an aggregated security return distribution for said first portfolio,
wherein generating said first return distribution for each of the first plurality of securities, comprises:
    (a) sampling a value from each of the one or more risk factor's best fit fat-tailed t-distribution;
    (b) conducting a simulation based on a scenario defined by said sampled values;
    (c) incorporating data regarding a correlation among each of the one or more risk factors;
    (d) multiplying the sampled value from each of the one or more risk factor's best fit fat-tailed distribution by a risk factor exposure corresponding to each of the one or more risk factors to obtain a risk factor product for each of the one or more risk factors; and
    (e) summing the risk factor product for each of the one or more risk factors to generate the return distribution..

8. The system of claim 7, further comprising a processor that performs steps (a)-(e) for each of a second plurality of securities in a second portfolio to generate a second return distribution for said second portfolio.

9. The system of claim 8, further comprising a processor that generates a tracking error distribution for said first portfolio by calculating a difference between the first return distribution for said first portfolio and the second return distribution for said second portfolio, and aggregates said first return distribution and said second return distribution.

10. The system of claim 9, further comprising a processor that calculates value at risk for said first portfolio based on said first return distribution for said first portfolio and said tracking error distribution.

11. The system of claim 9, further comprising a processor that calculates expected shortfall for said first portfolio based on said first return distribution for said first portfolio and said tracking error distribution.

12. The system of claim 9, further comprising a processor that calculates volatility for said first portfolio based on said first return distribution for said first portfolio and said tracking error distribution.

* * * * *